(12) United States Patent
Lee et al.

(10) Patent No.: US 10,657,259 B2
(45) Date of Patent: May 19, 2020

(54) PROTECTING COGNITIVE SYSTEMS FROM GRADIENT BASED ATTACKS THROUGH THE USE OF DECEIVING GRADIENTS

(71) Applicant: International Business Machines Corporation, Armonk, NY (US)

(72) Inventors: Taesung Lee, White Plains, NY (US); Ian M. Molloy, Chappaqua, NY (US); Farhan Tejani, Plano, TX (US)

(73) Assignee: International Business Machines Corporation, Armonk, NY (US)

( * ) Notice: Subject to any disclaimer, the term of this patent is extended or adjusted under 35 U.S.C. 154(b) by 156 days.

(21) Appl. No.: 15/800,697

(22) Filed: Nov. 1, 2017

(65) Prior Publication Data
US 2019/0130110 A1    May 2, 2019

(51) Int. Cl.
*G06F 21/56*    (2013.01)
*G06F 21/57*    (2013.01)
*G06N 3/02*     (2006.01)

(52) U.S. Cl.
CPC .............. *G06F 21/57* (2013.01); *G06N 3/02* (2013.01); *G06F 2221/034* (2013.01)

(58) Field of Classification Search
None
See application file for complete search history.

(56) References Cited

U.S. PATENT DOCUMENTS 5,359,699 A    10/1994 Tong et al.
5,371,809 A    12/1994 Desieno
(Continued)

FOREIGN PATENT DOCUMENTS

CN    105718945 A    6/2016
CN    106127729 A    11/2016
(Continued)

OTHER PUBLICATIONS

Liao, Q, et al. "Theory of Deep Learning II: Landscape of the Empirical Risk in Deep Learning" [online], Jun. 22, 2017 [retrieved Jul. 25, 2019]. Retrieved from the Internet: https://arxiv.org/pdf/1703.09833.pdf (Year: 2017).*

(Continued)

*Primary Examiner* — Taghi T Arani
*Assistant Examiner* — Joshua R White
(74) *Attorney, Agent, or Firm* — Stephen J. Walder, Jr.; Jeffrey S. LaBaw

(57) ABSTRACT

Mechanisms are provided for providing a hardened neural network. The mechanisms configure the hardened neural network executing in the data processing system to introduce noise in internal feature representations of the hardened neural network. The noise introduced in the internal feature representations diverts gradient computations associated with a loss surface of the hardened neural network. The mechanisms configure the hardened neural network executing in the data processing system to implement a merge layer of nodes that combine outputs of adversarially trained output nodes of the hardened neural network with output nodes of the hardened neural network trained based on the introduced noise. The mechanisms process, by the hardened neural network, input data to generate classification labels for the input data and thereby generate augmented input data which is output to a computing system for processing to perform a computing operation.

20 Claims, 7 Drawing Sheets

(56) References Cited

U.S. PATENT DOCUMENTS

| | | | |
|---|---|---|---|
| 7,409,372 | B2 | 8/2008 | Staelin et al. |
| 8,275,803 | B2 | 9/2012 | Brown et al. |
| 9,390,370 | B2 | 7/2016 | Kingsbury |
| 2004/0260662 | A1 | 12/2004 | Staelin et al. |
| 2009/0287678 | A1 | 11/2009 | Brown et al. |
| 2011/0066587 | A1 | 3/2011 | Ferrucci et al. |
| 2011/0125734 | A1 | 5/2011 | Duboue et al. |
| 2013/0007055 | A1 | 1/2013 | Brown et al. |
| 2013/0018652 | A1 | 1/2013 | Ferrucci et al. |
| 2013/0066886 | A1 | 3/2013 | Bagchi et al. |
| 2017/0011738 | A1* | 1/2017 | Senior .............. G10L 15/063 |
| 2017/0187747 | A1 | 6/2017 | Huston, III et al. |
| 2017/0206449 | A1 | 7/2017 | Lain |
| 2017/0230400 | A1 | 8/2017 | Ahmed et al. |
| 2018/0211164 | A1* | 7/2018 | Bazrafkan .............. G06N 3/088 |
| 2019/0095629 | A1 | 3/2019 | Lee et al. |

FOREIGN PATENT DOCUMENTS

| | | | |
|---|---|---|---|
| CN | 106296692 | A | 1/2017 |
| CN | 106845471 | A | 6/2017 |
| CN | 107025284 | A | 8/2017 |
| CN | 107147603 | A | 9/2017 |
| CN | 107240085 | A | 10/2017 |
| WO | WO2018028255 | A1 | 2/2018 |
| WO | WO-2018231708 | A2 * | 12/2018 |

OTHER PUBLICATIONS

Grosse, Kathrin, et al. "Adversarial Perturbations Against Deep Neural Networks for Malware Classification" [online], Jun. 16, 2016 [retrieved Jul. 25, 2019]. Retrieved from the Internet: https://arxiv.org/pdf/1606.04435.pdf (Year: 2016).*

Papernot, N, et al. "Practical Black-Box Attacks against Machine Learning" [online], Mar. 19, 2017 [retrieved Jul. 25, 2019]. Retrieved from the Internet: https://arxiv.org/pdf/1602.02697.pdf (Year: 2017).*

Liao, Q, et al. "Theory of Deep Learning II: Landscape of the Empirical Risk in Deep Learning" [online], Jun. 22, 2017 [retrieved Jul. 25, 2019]. Retrievede from the internet: https://arxiv.org/pdf/1703.09833.pdf (Year: 2017).*

Lou, Yixin and Yang, Fan. "Deep Learning With Noise." [online], archived on internet as of at least Jun. 6, 2016, [retrieved Jul. 25, 2019]. Retrieved from the Internet via the Wayback MAchine: https://web.archive.org/web20160606140250/http://www.andrew.cmu.edu/user/fanyang1/deep-learning-with-noise.pdf (Year: 2016).*

Grosse, Kathrin, et al. "Adversarial Perturbations Against Deep Neural Networks for Malware Classification" [online], Jun. 16, 2016 [retrieved Jul. 25, 2019]. Retrieved from the Internet: https://arxiv.org/pdf/1606.04435.pdf (Year: 16).*

Marr, Bernard. "What Everyone Should Know About Cognitive Computing" [online], Mar. 23, 2016 [retrieved Jul. 25, 2019]. Retrieved from the Internet: https://www.forbes.com/sites/bernardmarr/2016/03/23/what-everyone-should-know-about-cognitive-computing/#6da9c7eb5088 (Year: 2016).*

Carlini, Nicholas et al., "Towards Evaluating the Robustness of Neural Networks", 2017 IEEE Symposium on Security and Privacy, May 22-24, 2017, pp. 39-57.

Goodfellow, Ian J. et al., "Explaining and Harnessing Adversarial Examples", 3rd International Conference on Learning Representations (ICLR2015), arXiv: 1412.6572v3 [stat.ML], Mar. 20, 2015, pp. 1-11.

High, Rob, "The Era of Cognitive Systems: An Inside Look at IBM Watson and How it Works", IBM Corporation, Redbooks, Dec. 12, 2012, 16 pages.

McCord, M.C. et al., "Deep parsing in Watson", IBM J. Res. & Dev. vol. 56 No. 3/4 Paper 3, May/Jul. 2012, pp. 3:1-3:15.

Papernot, Nicolas et al., "The Limitations of Deep Learning in Adversarial Settings", IEEE European Symposium on Security and Privacy 2016, arXiv: 1511.07528v1 [cs.CR], Nov. 24, 2015, 16 pages.

Perekrestenko, Dmytro, "Layer-by-layer visualizations of MNIST dataset feature representations", https://lts2.epfl.ch/blog/perekres/2015/02/21/layer-by-layer-visualizations-of-mnist-dataset-feature-representations/, Institute of Electrical Engineering of the EPFL, LTS2, Feb. 21, 2015, 5 pages.

Sanfelix, Eloi et al., "Unboxing the White-Box, Practical attacks against Obfuscated Ciphers", Riscure, 2015, 38 pages.

Yuan, Michael J., "Watson and healthcare, How natural language processing and semantic search could revolutionize clinical decision support", IBM Corporation, IBM developerWorks, http://www.ibm.com/developerworks/industry/library/ind-watson/, Apr. 12, 2011, 14 pages.

International Search Report and Written Opinion dated Feb. 20, 2019 for International Application No. PCT/IB2018/058438, 9 pages.

Google, Cloud vision API. [Online]. Available: https://cloud.google.com/vision/, Accessed from the Internet on Aug. 6, 2019, 23 pages.

IBM. Watson visual recognition. [Online]. Available: https://www.ibm.com/watson/services/visual-recognition/pricing/index.html#pricing, Accessed from the Internet on Aug. 6, 2019, 4 pages.

List of IBM Patents of Patent Application Treated as Related, Jan. 6, 2020, 2 pages.

"Cognitive services pricing—computer vision API", Microsoft. [Online]. Available: https://azure.microsoft.com/en-us/pricing/details/cognitive-services/computer-vision/, Accessed from the Internet on Aug. 6, 2019, 7 pages.

Bucila, Cristian et al., "Model Compression", In Proceedings of the 12th ACM SIGKKD international conference on Knowledge discovery and data mining, Aug. 2006, 7 pages.

Chollet, Francois, "Xception: Deep Learning with Depthwise Separable Convolutions", IEEE conference on Computer Vision and Pattern Recognition (CVPR), Jul. 2017, pp. 1251-1258.

Ciresan, Dan et al., "Multi-column Deep Neural Networks for Image Classification", IEEE Conference on Computer vision and pattern recognition (CVPR), Jun. 2012 . 8 pages.

Coates, Adam et al., "An Analysis of Single-Layer Networks in Unsupervised Feature Learning", In Proceedings of the fourteenth international conference on artificial intelligence and statistics, Apr. 2011, 9 pages.

He, Kaiming et al., "Deep Residual Learning for Image Recognition", 29th IEEE Conference on Computer Vision and Pattern Recognition (CVPR2016), Jun. 26-Jul. 1, 2016, pp. 1-12. (Version attached: arXiv: 1512.03385v1 [cs.CV]—Dec. 10, 2015).

Hinton, Geoffrey et al., "rmsprop: Divide the gradient by a running average of its recent magnitude", Lecture 6a, Overview of mini-batch gradient descent, http://www.cs.toronto.edu/~tijmen/csc321/slides/ lecture_slides_lec6.pdf, accessed: Apr. 23, 2018., 31 pages.

Howard, Andrew G. et al., "Mobilenets: Efficient Convolutional Neural Networks for Mobile Vision Applications", arXiv preprint arXiv:1704.04861, Apr. 17, 2017, 9 pages.

Kingma, Diederik P. et al., "Adam: A Method for Stochastic Optimization", arXiv preprint arXiv:1412.6980, 2014, Jan. 30, 2017, 15 pages.

Krizhevsky, Alex , "Learning Multiple Layers of Features from Tiny Images", University of Toronto, Tech. Rep., Apr. 8, 2009, 60 pages.

Lecun, Yann et al., "Gradient-Based Learning Applied to Document Recognition", Proceedings of the IEEE, vol. 86, No. 11, Nov. 1998, pp. 2278-2324.

Lichman, M., "UCI machine learning repository", 2013. [Online]. Available: http://archive.ics.uci.edu/ml, Accessed from the Internet on Aug. 6, 2019, 2 pages.

Maas, Andrew L. et al., "Learning Word Vectors for Sentiment Analysis", In Proceedings of the 49th Annual Meeting of the Association for Computational Linguistics: Human Language Technologies. Portland, Oregon, USA: Association for Computational Linguistics, Jun. 2011, pp. 142-150.

Papernot, Nicholas et al., "Practical Black-Box Attacks Against Machine Learning", Proceedings of the 2017 ACM on Asia Conference on Computer and Communications Security, New York, NY, [Online]. Available: http://doi.acm.org/10.1145/3052973.3053009, Apr. 2017, pp. 506-519.

Ringger, Eric K. et al., "Assessing the Costs of Machine-Assisted Corpus Annotation through a User Study", Proceedings of the 2008

(56) References Cited

OTHER PUBLICATIONS

International Conference on Language Resources and Evaluation (LREC), May 26-Jun. 1, 2008, 7 pages.

Romero, Adriana et al., "FitNets: Hints for Thin Deep Nets", CoRR abs, arXiv:1412.6550v4, Mar. 2015, 13 pages.

Schuster, Mike et al., "Bidirectional Recurrent Neural Networks", IEEE Transactions on Signal Processing, vol. 45, No. 11, Nov. 1997, pp. 2673-2681.

Shi, Yi et al., "How to Steal a Machine Learning Classifier with Deep Learning", 2017 IEEE International Symposium on Technologies for Homeland Security (HST), Apr. 2017, pp. 1-5.

Springenberg, Jost T. et al., "Striving for Simplicity: The All Convolutional Net", CoRR, vol. abs/1412.6806, 2014. [Online]. Available: http://arxiv.org/abs/1412,6806, v3, Apr. 13, 2015, 14 pages.

Szegedy, Christian et al., "Rethinking the Inception Architecture for Computer Vision", Proceedings of the IEEE Conference on Computer Vision and Pattern Recognition, Jun. 2016, 10 pages.

TRAMèR, Florian et al., "Stealing Machine Learning Models via Prediction APIs", 25th USENIX Security Symposium (USENIX Security 16), Aug. 2016, 19 pages.

Wang, Binghui et al., "Stealing hyperparameters in Machine Learning", 39th IEEE Symposium on Security and Privacy (SP), May 2018, 17 pages.

Xiao, Han et al., "Fashion-MNIST: A Novel Image Dataset for Benchmarking Machine Learning Algorithms", arXiv: 1708.07747v2 [cs.LG], Sep. 15, 2017, 6 pages.

\* cited by examiner

| TRUTH | CLASS | | | | | | | | | |
|---|---|---|---|---|---|---|---|---|---|---|
| | 0 | 1 | 2 | 3 | 4 | 5 | 6 | 7 | 8 | 9 |
| 0 | 79.5 | 0.1 | 4.6 | 0.2 | 0.5 | 2.9 | 2.4 | 1.7 | 6.9 | 1.1 |
| 1 | 0.7 | 16.1 | 15.7 | 2.0 | 14.4 | 3.3 | 3.9 | 24.0 | 19.9 | 0.0 |
| 2 | 1.6 | 1.3 | 71.0 | 4.0 | 1.4 | 4.7 | 0.6 | 11.0 | 4.3 | 0.3 |
| 3 | 4.8 | 0.2 | 2.6 | 78 | 0.3 | 7.5 | 0.1 | 0.6 | 5.1 | 0.8 |
| 4 | 0.5 | 1.0 | 0.7 | 3.3 | 71.6 | 0.3 | 0.9 | 7.7 | 4.1 | 9.9 |
| 5 | 0.7 | 0.1 | 3.4 | 14.6 | 0.2 | 67.2 | 1.1 | 1.2 | 9.2 | 2.4 |
| 6 | 4.8 | 0.1 | 6.8 | 0.1 | 4.1 | 4.3 | 74.2 | 0.1 | 5.5 | 0.0 |
| 7 | 0.1 | 2.9 | 5.9 | 1.5 | 1.0 | 1.5 | 0.6 | 74.6 | 8.9 | 3.0 |
| 8 | 0.8 | 0.2 | 2.1 | 4.7 | 0.2 | 6.0 | 0.7 | 0.7 | 83.6 | 1.0 |
| 9 | 0.5 | 0.8 | 1.4 | 1.9 | 17.1 | 1.0 | 0.0 | 31.1 | 4.5 | 41.7 |

PROTECTING COGNITIVE SYSTEMS FROM GRADIENT BASED ATTACKS THROUGH THE USE OF DECEIVING GRADIENTS

BACKGROUND

The present application relates generally to an improved data processing apparatus and method and more specifically to mechanisms for protecting cognitive systems from gradient based attacks through the use of deceiving gradients.

Deep learning is part of a broader family of machine learning methods based on learning data representations as opposed to task-specific algorithms. Some representations are loosely based on interpretation of information processing and communication patterns in a biological nervous system, such as neural coding that attempts to define a relationship between various stimuli and associated neuronal responses in the brain. Research attempts to create efficient systems to learn these representations from large-scale, unlabeled data sets.

Deep learning architectures such as deep neural networks, deep belief networks, and recurrent neural networks, have been applied to fields including computer vision, speech recognition, natural language processing, audio recognition, social network filtering, machine translation, and bioinformatics where they produced results comparable to, and in some cases superior to, human experts.

Neural network based deep learning is a class of machine learning algorithms that use a cascade of many layers of nonlinear processing units for feature extraction and transformation. Each successive layer uses the output from the previous layer as input. The algorithms may be supervised or unsupervised and applications include pattern analysis (unsupervised) and classification (supervised). Neural network based deep learning is based on the learning of multiple levels of features or representations of the data with higher level features being derived from lower level features to form a hierarchical representation. The composition of a layer of nonlinear processing units of the neural network used in a deep learning algorithm depends on the problem to be solved. Layers that have been used in deep learning include hidden layers of an artificial neural network and sets of complicated propositional formulas. They may also include latent variables organized layer-wise in deep generative models such as the nodes in deep belief networks and deep Boltzmann machines.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method is provided, in a data processing system comprising a processor and a memory, the memory comprising instructions which are executed by the processor to specifically configure the processor to implement a hardened neural network. The method comprises configuring the hardened neural network executing in the data processing system to introduce noise in internal feature representations of the hardened neural network. The noise introduced in the internal feature representations diverts gradient computations associated with a loss surface of the hardened neural network. The method also comprises configuring the hardened neural network executing in the data processing system to implement a merge layer of nodes that combine outputs of adversarially trained output nodes of the hardened neural network with output nodes of the hardened neural network trained based on the introduced noise. The method further comprises receiving, by the hardened neural network, input data for classification by the hardened neural network, and processing, by the hardened neural network, the input data to generate classification labels for the input data and thereby generate augmented input data. Moreover, the method comprises outputting, by the hardened neural network, the augmented input data to a computing system for processing of the augmented input data to perform a computing operation.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1:
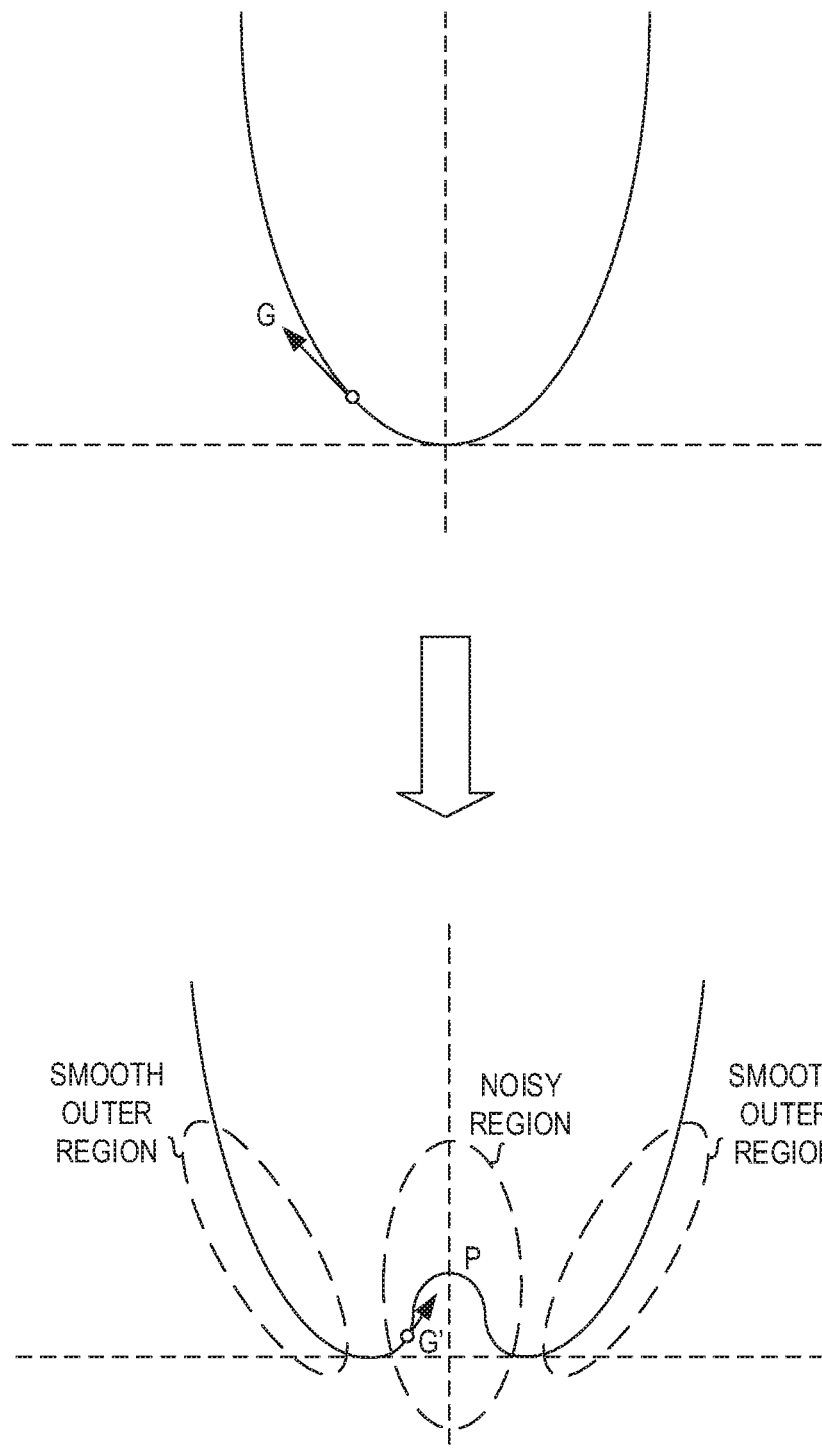
FIG. 1 is an example diagram illustrating the introduction of noise into a loss surface in accordance with one illustrative embodiment.

Various cognitive systems may utilize trained models, such as trained neural networks, to perform their cognitive operations. For example, a neural network implemented model may be used to provide image analysis, facial recognition, fingerprint or retinal image recognition, speech pattern analysis, or the like, for a cognitive security system, such as an image recognition surveillance system, a biometric authentication system, etc. Often times, such neural networks, and other types of machine learning or cognitive models, are utilized in or with cognitive systems to perform a classification operation upon which the cognitive system operates to perform a cognitive operation, e.g., classifying an input into one of a plurality of predetermined classifications (classes) which is then used to perform a more complex analysis or reasoning operation using cognitive system mechanisms.

Attackers may attempt to thwart such systems by performing evasion attacks, such as gradient-based attacks. An evasion attack on a cognitive system, e.g., on the neural network or other cognitive or machine learning model implemented by the cognitive system, involves the attacker attempting to fool the model to misclassify a manipulated input. For example, an attacker may make almost imperceptible manipulations on input data to generate adversarial input, where an adversarial input is an input formed by applying small, but intentional, perturbations to data samples from a data set (where the term "data set" as used herein refers to a set of one or more data samples), such that the perturbed input results in the model, e.g., neural network, outputting an incorrect answer with high confidence. The adversarial input will cause the neural network to misclassify the input and thus, malfunction, resulting in a breach of security. Such misclassification may prevent the system from correctly classifying valid inputs as valid, or allow invalid inputs to be incorrectly classified as valid. For example, an attacker attempting to fool a facial recognition neural network may purposefully add small imperfections to their appearance, and thereby generate an adversarial input, in an attempt to fool the facial recognition into misclassifying the attacker as an authorized individual.

Such evasion attacks, e.g., FGSM and the like, tend to be classifiable as white box attacks and are dependent upon the attacker identifying a correct gradient of the loss surface of the neural network or other cognitive or machine learning model. The loss surface, also referred to as the loss function or cost function, in the context of machine learning, neural networks, and cognitive system operations, is a function that represents the price paid for inaccuracy of predictions, e.g., the cost of inaccuracy in a classification prediction. A white box attack involves the attacker having full access to the cognitive system and the attacker may in fact be a user of the cognitive system, as opposed to black box attacks where the attacker does not have access to the endpoints of a secure transaction, or a gray box attack in which the attacker is able to interact with one or more of the endpoints via observation and/or alteration of system parts and processes. Such white box attacks are mostly based on gradients, as described in Goodfellow et al., "Explaining and Harnessing Adversarial Examples," ICLR 2015, Mar. 20, 2015. For example, the JSMA attack is a type of white box attack that greedily modifies one pixel at a time until the image is classified incorrectly. The FGSM attack takes a single step, for all pixels, in the direction of the gradient. The Carlini and Wagner attack uses gradient descent to optimize a custom loss function.

Many defense approaches to such white box attacks use a classifier to identify an adversarial input, i.e. classify an input as either a normal input or an adversarial input. However, these approaches often fail when the classifier itself is considered as part of the white box attack. Thus, it would be beneficial to be able to harden models used in cognitive systems, and hence the cognitive system itself, against evasion attacks, e.g., gradient based attacks, by preventing such adversarial inputs from causing the model to misclassify the input data.

In addressing these issues and providing such mechanisms, the illustrative embodiments, rather than using a classifier to identify an adversarial input, directly hinders proper gradient computation by adding noise in the model itself, e.g., noise in the internal feature representations of the neural network itself, such that gradient computations are diverted. That is, most white box attacks compute gradients to find the manipulations of input data that will cause the most rapid model decision change, e.g., classification change. The present invention constructs a loss surface of the model (assumed hereafter to be a neural network model, although other cognitive or machine learning models may also be utilized with the illustrative embodiments) to redirect the gradients from the actual gradients of the normally trained neural network, yet minimize misclassification.

In some illustrative embodiments, as shown in FIG. 1, noise is introduced into each class of the classification performed by the neural network during the training, such that the internal feature representation is perturbed and thus the gradient computation is diverted. That is, the construction of the loss surface of the model is achieved by adding one or more small pits P in the loss surface in a cluster of each class into which the model (e.g., neural network) classifies inputs, such that the gradients G' point toward the small pit as opposed to the correct gradient G for the neural network output. The pit P can be very small so that the change in the input with the gradient can simply skip the pit P and stay in the cluster, thereby foiling the attack and allowing continued proper classification by the model. It should be appreciated that while FIG. 1 shows this pit P as being a smooth pit in the loss surface S, in actuality, due to the introduction of noise in the pit P region, the curve may be quite disturbed in a noisy fashion.

In order to achieve this loss surface S with introduced pit P, or noisy region, in accordance with the mechanisms of one illustrative embodiment, a model, e.g., neural network, is built and trained to classify input data samples into N different classes. Once having obtained a trained model, three different sets of data are used to train a new protected model, e.g., a protected or hardened neural network, that is protected from adversarial input generation. A first set of training data is the original set of training data used to train the original model. A second set of training data are noisy data samples generated from the first set of training data with very small perturbations, using a method such as fast gradient sign methodology (described in Goodfellow et al. referenced above) with a small multiplier, e.g., $\varepsilon=0.1$, in the fast gradient sign function:

$$\eta = \varepsilon \; \text{sign}(\text{gradient}(J(\theta,x,y)))$$

where $\theta$ is the parameters of the neural network model, x is the input to the neural network model, y is the targets associated with x, $J(\theta, x, y)$ is the cost used to train the neural network, $\varepsilon$ is a multiplier, and $\eta$ is the perturbation. A third set of training data, referred to as the adversarial training data, is constructed in a manner similar to the second set of training data, but with a larger multiplier, e.g., $\varepsilon=0.3$. It should be appreciated that the value for epsilon may change depending on the particular implementation and may be empirically obtained.

It should also be appreciated that the fast gradient sign methodology for introducing perturbations is only on example mechanism for introducing such perturbations and others may be used without departing from the spirit and scope of the present invention. For example, other mechanisms that may be utilized is described in Carlini et al., "Towards Evaluating the Robustness of Neural Networks," IEEE Symposium on Security and Privacy, 2017 and Papernot et al., "The Limitations of Deep Learning in Adversarial Settings," IEEE European Symposium on Security and Privacy, 2016. These may be collectively referred to as perturbation functions.

The new protected model is trained with twice the output nodes in the last layer of the model. A first half of the output nodes are the same as the original trained model and are trained with the first set of training data. The first half of the output nodes are further trained to purposefully misclassify the second set of training data. That is, the training feedback purposefully instructs the neural network to misclassify the input to be a different classification than the correct classification given the input. In other words, the mechanisms of the illustrative embodiments apply a class mapping f(c) such that f(c)!=c so that data samples in class c are classified as f(c) instead. This introduces a noisy region into the loss curve of the neural network. It should be appreciated that the selection of the classes into which to train the misclassification is done in such a manner, as described hereafter, to minimize the noise in the noisy region while still causing gradients to be directed to the noisy region, or pit P. In one illustrative embodiment, the misclassification based training using the noisy data set (second set of training data) is performed based on a constructed confusion matrix, as described hereafter.

The second half of the output nodes are trained to classify the third set of training data. The third set of training data represents adversarial inputs and the training of the second half of the output nodes based on this adversarial data set is intended to train the output nodes to properly classify the adversarial data set. The training of the second half of the output nodes is separate from the training of the first half of the output nodes so that one training does not adversely affect the other. It should be appreciated that since there are two separate sets of output nodes that are trained separately, the training can be performed in any order and/or in parallel.

The combination of the first half of output nodes trained using the first set of training data (the normal unperturbed training data) and the second set of training data (noisy data), along with the adversarially trained second half of output nodes presents a loss curve having a noisy and sharp region, and outer portions that are smooth enough to cause the gradients to point towards the noisy region. That is, the first set of output nodes provides a loss surface having a noisy region, i.e. the pit P in FIG. 1, while the second set of output nodes provide a smoother and stretched outer surface causing gradients to point to a wrong or opposite direction. As a result, when an attacker is perturbing a normal sample to generate an adversarial sample using the gradients, the gradient from the normal sample points towards normal samples again or fall in the outer smooth region, but does not overcome these two areas. As the gradients in the noisy region are redirected from the true original gradient of the loss curve, the use of a gradient in the noisy region will cause an incorrect adversarial input being generated that will still point to the correct classification of the adversarial input as an improper input, i.e. the attacker is not able to cause the neural network to misclassify the adversarial input.

Thus, after training the new protected model using these three sets of training data, an additional layer of nodes, referred to as the merge layer having merge nodes, is added to the new protected model to merge the first half and second half of the output nodes by joining the adversarially trained class, i.e., the classification output vector generated by the second set of output nodes, to its original class, i.e. the classification output vector generated by the first set of output nodes, so that the regular data samples in the first set of training data, and the adversarially generated data samples in the third set of training data, are correctly classified. The first and third sets of training data fortify the new protected model while the second set of training data fools the gradient. That is, in an internal representation of data samples of the various sets of training data, the second set of data samples (noisy data samples) are sandwiched between the first (non-perturbed original training data samples) and third (adversarial data samples) training data sets so that the gradients from the first set of training data point toward the second set of training data. In this way, the direction of the gradients is changed such that an attacker cannot easily construct malicious data samples using gradients.

The performance of the defense offered by the illustrative embodiments may be affected by the manner in which the class mapping f(c) is built for performing the training based on the second set of training data, i.e. the mapping of the correct classification based on the noisy input data to an incorrect classification for forcing training of the neural network to misclassify the noisy input. In some illustrative embodiments, f(c) is built by first building a confusion matrix that counts data samples in each class. That is, the confusion matrix h(c, c') is defined as the number of data samples in c classified as c'. The least misclassified class, i.e. arg min_{c'} h(c,c'), is selected as f(c). That is, besides c, the illustrative embodiment selects the class c' with the smallest number of confusions in the confusion matrix. By doing this, the illustrative embodiments can divert gradients and also keep a sufficient distance from the classes the gradients are diverted to, such that the attacker cannot generate data samples that are classified as these classes.

The illustrative embodiments reduce or eliminate the attacker's ability to cause a neural network or other cognitive or machine learning model (assumed herein for illustration purposes to be a neural network) to misclassify input data, by introducing perturbations, or noise into the loss surface of the neural network and causing modification of the output probabilities generated by the neural network, so as to fool the attacker who is trying use the gradients of the loss surface to generate an adversarial input to the neural network. The perturbations, or noise, introduced by the mechanisms of the illustrative embodiments, and used to train the neural network, deviate the gradients from a correct direction and amount and minimize loss in the accuracy of the protected neural network model.

Thus, the mechanisms of the illustrative embodiments improve the operation of the neural network, and the cognitive system implementing the neural network, by adding additional non-generic functionality that previously did not exist in the neural network mechanism or cognitive system, specifically for hardening the neural network and cognitive system against adversarial attacks by providing deceiving gradients in the loss surface. The mechanisms of the illustrative embodiments add additional technological logic in the neural network and cognitive system that specifically implements the introduction of perturbations or noise in the loss surface, through specific training based on the three sets of training data (or data sets) mentioned above, such that a noisy region is generated in the loss surface, and small gradient outer regions are also generated, which cause gradients to point to the noisy region away from correct gradients while maintaining the usability of the resulting output, e.g., the classification and labeling of the output data is still accurate even though the actual probability values generated by the neural network (referred to herein also as the "model") are not accurate to the training of the model based on just the normal training data set, i.e. the unperturbed training data set.

The mechanisms of the illustrative embodiments are specific to a technological environment involving one or more data processing systems and/or computing devices that are specifically configured to implement the additional logic of the present invention thereby resulting in a non-generic technological environment comprising one or more non-generic data processing systems and/or computing devices. Moreover, the illustrative embodiments are specifically directed to solving the technological problem of hardening neural networks, cognitive models, or machine learning models against adversarial attacks by introducing deceiving gradients via specific training of specialized computing devices or systems having neural network models, machine learning models, deep learning models, or other such cognitive or artificial intelligence for performing a cognitive operation.

Before beginning the discussion of the various aspects of the illustrative embodiments in more detail, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on general purpose hardware, software instructions stored on a medium such that the instructions are readily executable by specialized or general purpose hardware, a procedure or method for executing the functions, or a combination of any of the above.

The present description and claims may make use of the terms "a", "at least one of", and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

Moreover, it should be appreciated that the use of the term "engine," if used herein with regard to describing embodiments and features of the invention, is not intended to be limiting of any particular implementation for accomplishing and/or performing the actions, steps, processes, etc., attributable to and/or performed by the engine. An engine may be, but is not limited to, software, hardware and/or firmware or any combination thereof that performs the specified functions including, but not limited to, any use of a general and/or specialized processor in combination with appropriate software loaded or stored in a machine readable memory and executed by the processor. Further, any name associated with a particular engine is, unless otherwise specified, for purposes of convenience of reference and not intended to be limiting to a specific implementation. Additionally, any functionality attributed to an engine may be equally performed by multiple engines, incorporated into and/or combined with the functionality of another engine of the same or different type, or distributed across one or more engines of various configurations.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2A:
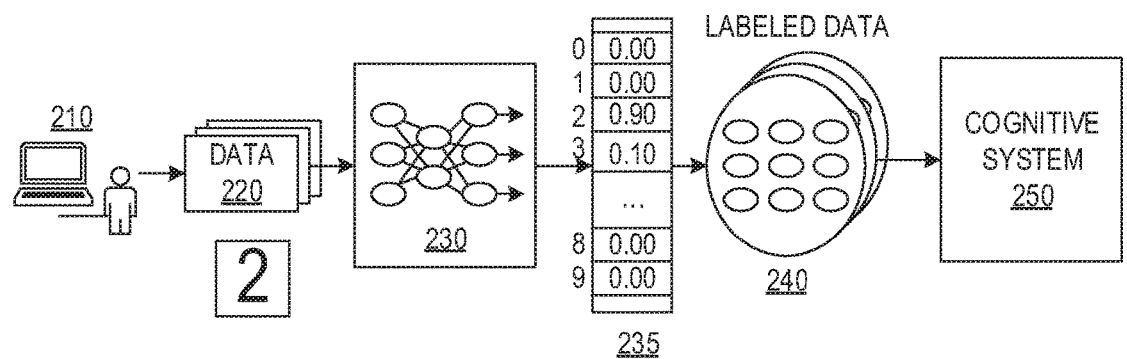
FIGS. 2A and 2B are block diagrams illustrating the problem addressed by the present invention.
Figure 2B:
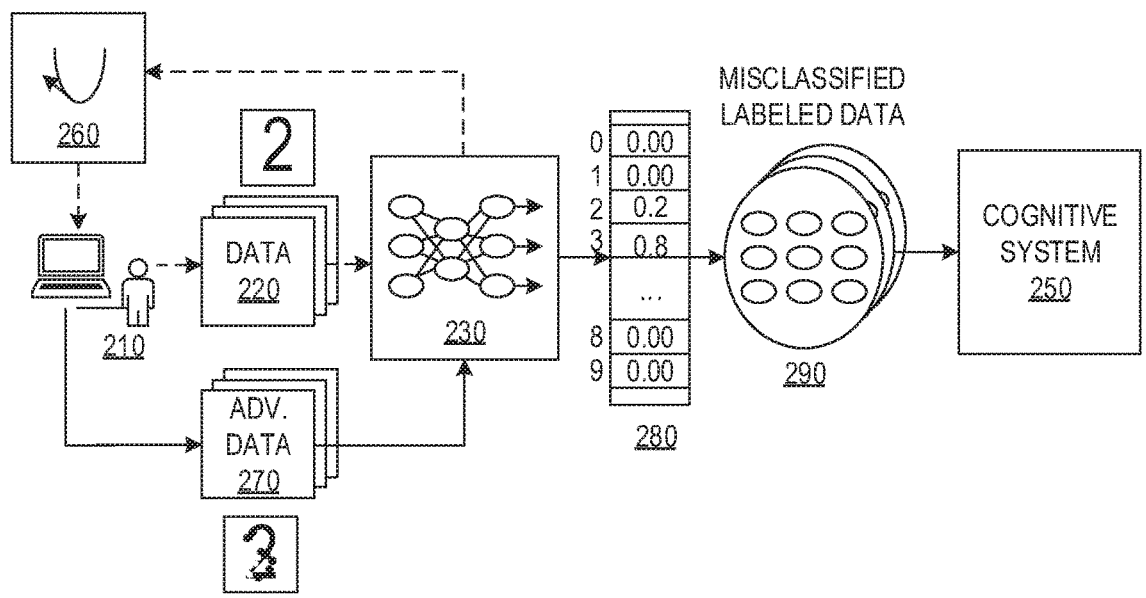

As noted above, the present invention provides mechanisms for protecting cognitive systems, such as those comprising neural networks and/or deep learning mechanisms, from gradient based attacks, such as an evasion attack. FIGS. 2A and 2B are block diagrams illustrating the problem addressed by the present invention. In the depiction of FIGS. 2A and 2B, it is assumed that a neural network model has been trained using training data, such as through a supervised or semi-supervised process using a ground truth data structure or the like, or any other known or later developed methodology for training a neural network model.

The example shown in FIGS. 2A and 2B assumes that the neural network model is being used to perform a classification operation on an image of a number to thereby classify the image of the number as a number from "0" to "9". This is used only as an example of one possible simple classification operation that the neural network model may be used to perform and is not to be considered limiting on the applications of a neural network model with which the mechanisms of the illustrative embodiments may be implemented. As noted above, the mechanisms of the illustrative embodiments may be utilized with the inputs/outputs of any neural network models, machine learning models, or the like, regardless of the particular artificial intelligence operations performed by the neural network models, machine learning models, or the like. Moreover, although not shown explicitly in FIGS. 2A and 2B, the neural network model, machine learning model, deep learning or cognitive model, or the like, may be part of a more complex cognitive system that implements such a model to perform a complex cognitive operation, such as natural language processing, image analysis, patient treatment recommendation, medical imaging analysis, cognitive security system, or any of a plethora of other cognitive operations, as described hereafter.

As shown in FIG. 2A, under normal operation, the neural network model 230 receives a set of input data 220 from a data source 210, which is processed through the neural network model to generate a vector output 235. In the depicted example of FIG. 2A, the trained neural network model 230 performs a classification operation for classifying the input data 220. The output of the classification operation is a vector output 235 of probability values where each slot of the vector output 235 represents a separate possible classification of the input data 220. The training of a neural network, machine learning, deep learning, or other artificial intelligence model is generally known in the art and it is assumed that any such methodology may be used to perform such training. The training generally involves modifying weighting values associated with various features scored by nodes of the model based on training data sets to cause the model to output a correct vector output 235 labeling the input data 220 correctly based on supervised or semi-supervised feedback. The neural network model 230 processes the input data 220 through the various levels of nodes in the neural network model 230 to generate at the output nodes probability values corresponding to the particular class or label that the output node represents, i.e. the output node's value indicates the probability that the class or label of the corresponding vector slot applies to the input data 220.

Thus, in a classification operation, each vector slot of the vector output 235 corresponds to a classification (or class) into which the input data may be classified, with a corresponding output node of the neural network model 230 providing the value to be stored in the corresponding vector slot. The value in the vector slot represents a probability that the input data is properly classified into the corresponding class associated with the vector slot. For example, in the depiction of FIGS. 2A and 2B, the classes are the numerical values 0 to 9, each numerical value being associated with a separate vector slot, and each vector slot having a value ranging from 0.00 (0% probability) to 1.00 (100% probability) indicating a probability that the corresponding class 0 to 9 is the correct class for the input data 220. For example, if the input data 220 represents an image of the number "2", then if the neural network model 230 has been trained correctly, then processing of the input data 220 by the neural network model 230 will result in a relatively high probability that the classification of the input data 220 is that it represents the number "2" and hence is in class "2." As shown in FIG. 2A, the probability for class "2" is 0.90 while the probability for class "3" is 0.10 and all other classes have a 0.00 probability. It should be appreciated that while the figure shows a precision of two decimal places for the probability values, this is merely used for illustration purposes and any desirable precision of the values stored in the vector output 235 may be used without departing from the spirit and scope of the present invention.

While this is a simple example used for illustrative purposes, it should be appreciated that the number of classifications and corresponding labels, as well as the corresponding vector output 235, may be quite complex. As another example, these classifications may be, for example, in a medical imaging application where internal structures of human anatomy are being classified in a patient's chest, e.g., an aorta, a heart valve, a left ventricle, right ventricle, lungs, etc. It should be appreciated that the vector output 235 may comprise any number of potential vector slots, or classifications, at various levels of granularity depending on the particular application and implementation, and the vector output 235 may be of various sizes correspondingly.

The resulting vector output 235 is used to generate labels or metadata that is associated with the input data 220 to generate labeled data set 240. A labeled data set 240 is a set of output data generated by the trained neural network model 230 where the unlabeled input data is augmented with additional tags or labels of meaningful information for the particular cognitive operation for which the data is to be used. For example, in a patient treatment recommendation cognitive system, the labeled data may comprise labels, tags, or annotations that specify various medical concepts with which the data is associated, e.g., a disease, a treatment, a patient's age, a patient's gender, etc. In the depicted example, the operation of the neural network model 230 is to classify a portion of an input image specified in a set of input data 220 into one of 10 categories representing numerical values that the portion of the input image represents, e.g., classes "0" to "9". Thus, the label that is affixed to a set of input data 120 may be a label of "0" or "1" or "2", etc.

Thus, the classification generated by the neural network model 230 is used to associate an appropriate label of one or more of the classes in the vector output 235 based on the corresponding values stored in the vector slots for those classes. For example, the highest ranking class may be selected for use in labeling the input data. In some implementations, multiple classes may be represented in the labels generated and associated with the input data 220 to generate the labeled data 240, e.g., classes having a probability value greater than a predetermined threshold may have labels generated and associated with the input data 220 to generate the labeled data 240.

The labeled data 240 is then input to the cognitive system 250 for performance of cognitive operations on the labeled data 240. The particular cognitive operation performed by the cognitive system 250 depends on the cognitive system and may be any of a plethora of different types of cognitive operations. Examples of cognitive operations include various types of decision making operations or decision support operations, such as security system based operations for controlling access to facilities, data, or any other secure asset. Such security system cognitive operations may employ the labeled data 240 to perform facial recognition, voice print recognition, biometrics based decision making, or the like. Other implementations of the cognitive system 250 may involve various types of natural language processing, such as for question answering or request processing, image analysis, such as for medical image analysis for patient diagnosis and treatment recommendations, or any other evaluation of an input data for purposes of making decisions and generating results in which the cognitive system emulates human thought processes.

As shown in FIG. 2B, assuming that the data source 210 is an attacker performing a white box gradient based attack, such as an evasion attack, the attacker may attempt to cause the neural network model 230 to misclassify the input data 220 by modifying the input data 220 to include imperceptible manipulations on the input data 220 and thereby generate adversarial input 270. In order to generate the adversarial data 270, the attacker may analyze the loss surface 260 of the neural network model 230 to determine an appropriate gradient that shows the least manipulation of the input data that causes the greatest change in the classification performed by the neural network model 230. For example, the attacker may access the neural network, or a copy of the neural network, or may perform a model stealing attack by querying the model to label unlabeled data and train their own copy of the model. Thereafter, obtaining the loss surface is straightforward, as it is defined inside the neural network. For example, if the neural network is a function f, mapping input x to f(x), the loss given x and its label y is $L(f(x),y)$. This function L is usually defined when the neural network is defined and thus, is part of the neural network. Typical examples include cross entropy loss, and mean squared error. The gradient the attacker needs to compute is the gradient of $L(f(x),y))$.

The selected gradient is from the loss surface 260 is then used to inject manipulations into the input data 220 to generate the adversarial input data 270 which is intended to fool the neural network model 230 to misclassify the actual input data 220 due to the injected manipulations. Thus, rather than generating the output vector 235 of FIG. 2A for the input data 220, the neural network model 230 generates the manipulated output vector 280 in FIG. 2B based on the adversarial input data 270, which causes a misclassification of the input data 220. In this case, rather than the input image of the value "2" being recognized as having class "2", the neural network model 230 processes the adversarial input data 270 and determines there to be a higher probability that the input data represents the numerical value "3" and outputs a corresponding manipulated output vector 280. The result is a misclassified labeled data set 290 that is input to the cognitive system 250 which in turn performs an incorrect cognitive operation due to the misclassification by the neural network model 230, due to the adversarial input 270, which is reflected in the misclassified labeled data set 290. Thus, one can imagine that an attacker may cause the neural network model 230 to perceive an invalid input as a valid input, or vice versa, and may be able to obtain access to assets that the attacker may otherwise not be permitted access, for example.

Figure 3A:
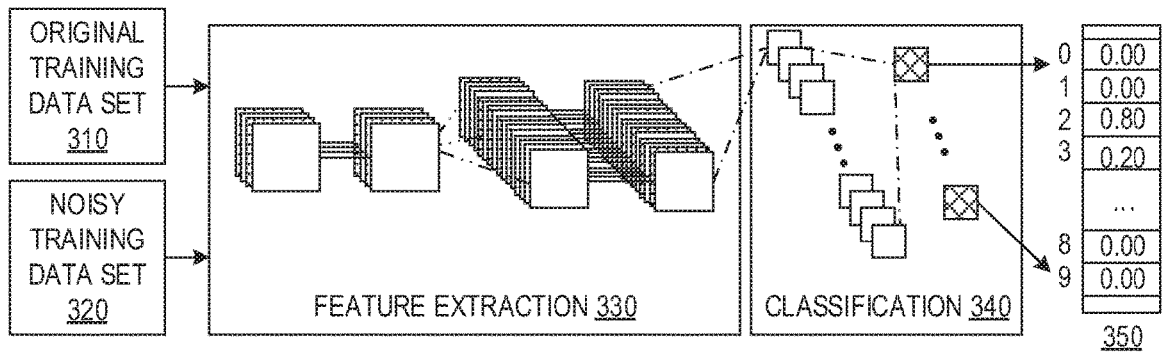
FIGS. 3A-3C are example block diagrams illustrating the separate training of a modified model according to one illustrative embodiment.
Figure 3B:
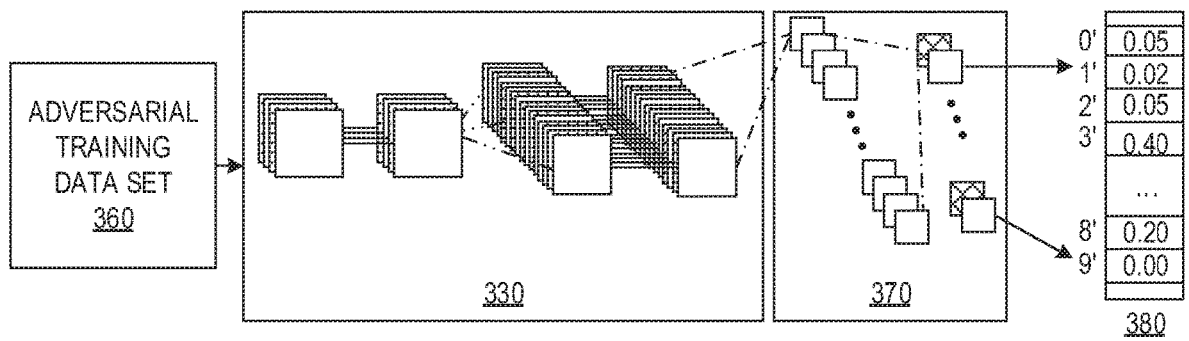
Figure 3C:
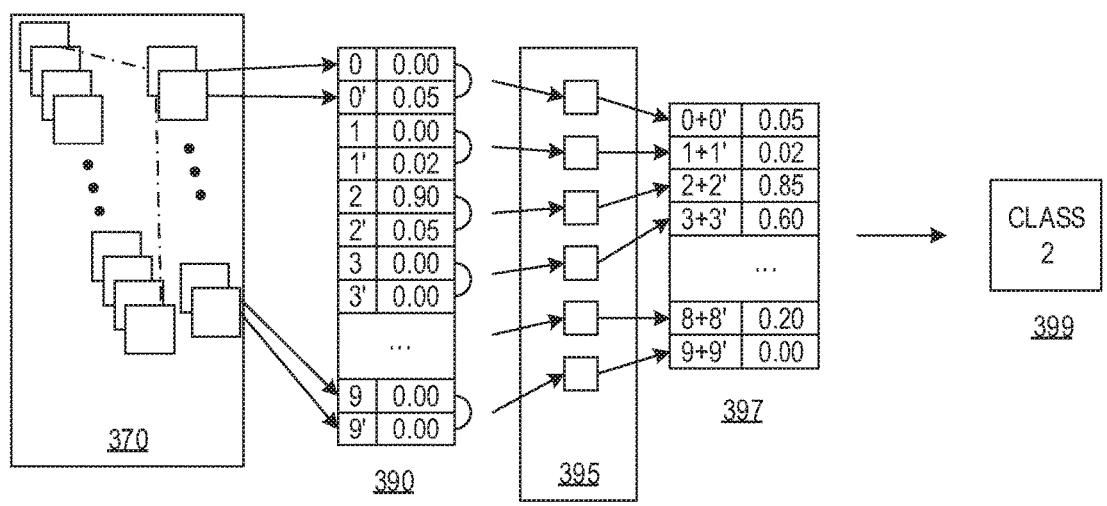

FIGS. 3A-3C are example block diagrams illustrating the separate training of a modified model according to one illustrative embodiment. FIG. 3A, in particular, shows training of a first set of output nodes of the modified model using the first and second training data sets, referred to respectively as the normal (or non-perturbed) training data set and the noisy training data set (in which a small multiplier is utilized as noted above). FIG. 3B shows the training of a second set of output nodes of the modified model using the third training data set, referred to as the adversarial training data set. FIG. 3C demonstrates the modified model after training in which an additional merge layer of merge nodes is added to merge the results generated by the first and second sets of output nodes.

As shown in FIG. 3A, the neural network includes a feature extraction portion 330 and a classification portion 340. In a convolutional neural network, such as that shown in FIGS. 3A-3C, feature extraction portion 330 has one or more layers of nodes for performing feature mappings based on the input received. The classification portion 340 comprises one or more layers of nodes that classify the input according to the extracted features by evaluating the various features in accordance with one or more criteria. The classification portion 340 terminates in a layer of output nodes that output the probability values for the various classifications associated with those output nodes. The probabilities represent the probability that the corresponding class is the correct class for the input data, e.g., the probability that the image input is the image of the numeral "2". The links between nodes are typically weighted with the weights being learned through a machine learning process involving training based on various training data sets, as is generally known in the art.

With the mechanisms of the illustrative embodiments, the classification portion 340 of the neural network is provided with two sets of output nodes instead of the standard single set of output nodes. The first set of output nodes is trained using an original, unperturbed, training data set 310 and also a second training data set, referred to as the noisy training data set 320, in which small perturbations are inserted into the original training data set 310, such as by way of a fast gradient sign methodology as described above. The second set of output nodes is trained separately using an adversarial training data set 360 in which larger perturbations, based on a larger multiplier in the fast gradient sign methodology, for example.

Thus, as shown in FIG. 3A, the neural network's output nodes in the classification portion 340 are trained using the original training data set 310 and the noisy training data set 320 to generate an output vector 350 with vector slot values representing the probability that the corresponding classes are the correct class for the input training data. In particular, with regard to the original training data set 310, the output nodes are trained in a normal fashion and thus, would have appropriate weights and outputs to properly classify the input data into a corresponding class, such as shown in FIG. 2A previously. With regard to training the output nodes based on the noisy training data set 320, the output nodes in classification portion 340 are trained to purposefully misclassify the input data of the noisy training data set 320. That is, if the normal training of the noisy training data set were to indicate that the input data was a representation of the numerical value "3", then the training of the output nodes with regard to noisy training data set 320 in accordance with the illustrative embodiments may instead instruct the neural network that the correct classification is "4" or one of the other classifications, thereby purposefully redirecting the classification learning of the output node. In this way, noise is added to the loss surface.

Figures 3D, 4:
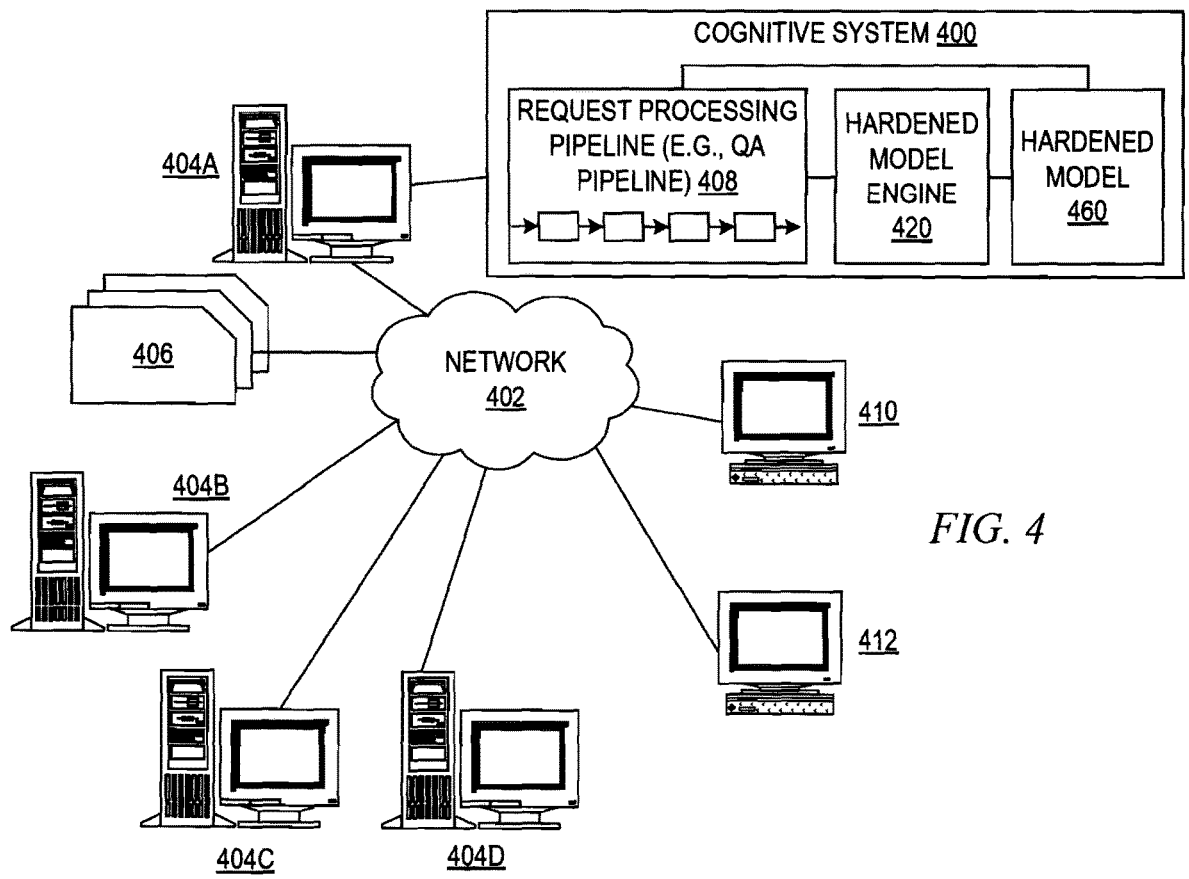
FIG. 3D is an example diagram illustrating an example confusion matrix in accordance with one illustrative embodiment.
FIG. 4 is a block diagram of an example cognitive system in which aspects of the illustrative embodiments are implemented.

In one illustrative embodiment, the selection of which alternative classifications to use to train the output nodes to misclassify the noisy training data set 320 may be performed based on a constructed confusion matrix. FIG. 3D is an example diagram illustrating an example confusion matrix in accordance with one illustrative embodiment. As shown in FIG. 3D, the confusion matrix is an N×N matrix, where N is the number of classifications, in which entries in the matrix represent the probability that an input data is classified in each of the classes, e.g., an input of data representing an image of the numeral "2" is classified as a 0, 1, 2, 3, 4 . . . 9. In order to generate the confusion matrix, the neural network is first normally trained and then, with a set of test data, the neural network is used to attempt to classify the test data, and the confusion matrix is built. For example, given a sample x with label y, the trained model (neural network) can classify the sample x as y'. The instances in which y is classified as y' are counted and the values are placed in the confusion matrix (y-th row and y'-th column).

With the mechanisms of the illustrative embodiments, when informing the neural network to misclassify the noisy input data 320, the corresponding non-perturbed input from data set 310 is used to identify the correct input data, or truth, to reference in the matrix, and a corresponding classification having a lowest probability is selected from the possible classifications. Thus, for example, if the input data value is truly an image of the numeral "7", then a misclassification class selected for training the neural network using the noisy training data set version of the input data value of the image of the numeral "7" will be "6" as it has the minimum probability of 0.6.

The neural network is then informed that the correct classification for the noisy training data set 320 for the perturbed input data is the lowest probability class from the confusion matrix. The neural network will then use machine learning techniques to modify the weights associated with the output nodes and adjust the learning to more closely approximate what the neural network is being told is the correct classification for the noisy training data set 320. Thus, the combined training based on the original training data set 310 and the noisy training data set 320 compete with each other so as to create noise in the output of the neural network in the region defined by the perturbations, or pits P, introduced in the noisy training data set 320.

As shown in FIG. 3B, the second set of output nodes in the classification portion 370 of the neural network are trained on the adversarial training data set 360. Classification portion 340 in FIG. 3A may be the same as classification portion 370, i.e. classification portion 340 may have the second set of output nodes as well but not being used for training based on training data sets 310, 320, but is designated with a different reference number to designate the representation of the second set of output nodes being utilized in the training based on the adversarial training data set 360. The training based on the adversarial training data set 360 is performed in a similar manner as the original training data set 310 such that the second set of output nodes is properly trained to classify the adversarial training data set 360 and generate a second vector of output values for classes 0', 1', 2' ... 9'.

Thus, the extended neural network having the two sets of output nodes provides twice the outputs as the original neural network, i.e. 0, 0', 1, 1', 2, 2', etc. which may be output as an extended vector output 390, as shown in FIG. 3C. In order to obtain a useable output specifying a classification in accordance with the perturbed loss surface shown in FIG. 1, the outputs of the two sets of output nodes are merged in a merge layer 395, having a plurality of merge nodes that perform the merging of two corresponding vector slots, to generate a single vector output 397 having a single vector slot for each class. The value in each vector slot of the merged vector output 397 is the sum of the probability values stored in the corresponding x and x' vector slots of the two sets of output nodes such that vector slot 0 is summed with vector slot 0', vector slot 1 is summed with vector slot 1', etc. as shown in FIG. 3C. These merged vector slot values may then be used to identify a corresponding label, tag, or the like, 399 to use to augment or label the input data.

Thus, the training of the neural network based on the original training data set 310 and the adversarial training data set 360 operates to fortify the neural network, or model, while the training of the neural network based on the noisy training data set 320 fools the gradient identification by potential attackers. As a result, a new protected neural network is generated that is hardened against gradient based attacks.

Figure 5:
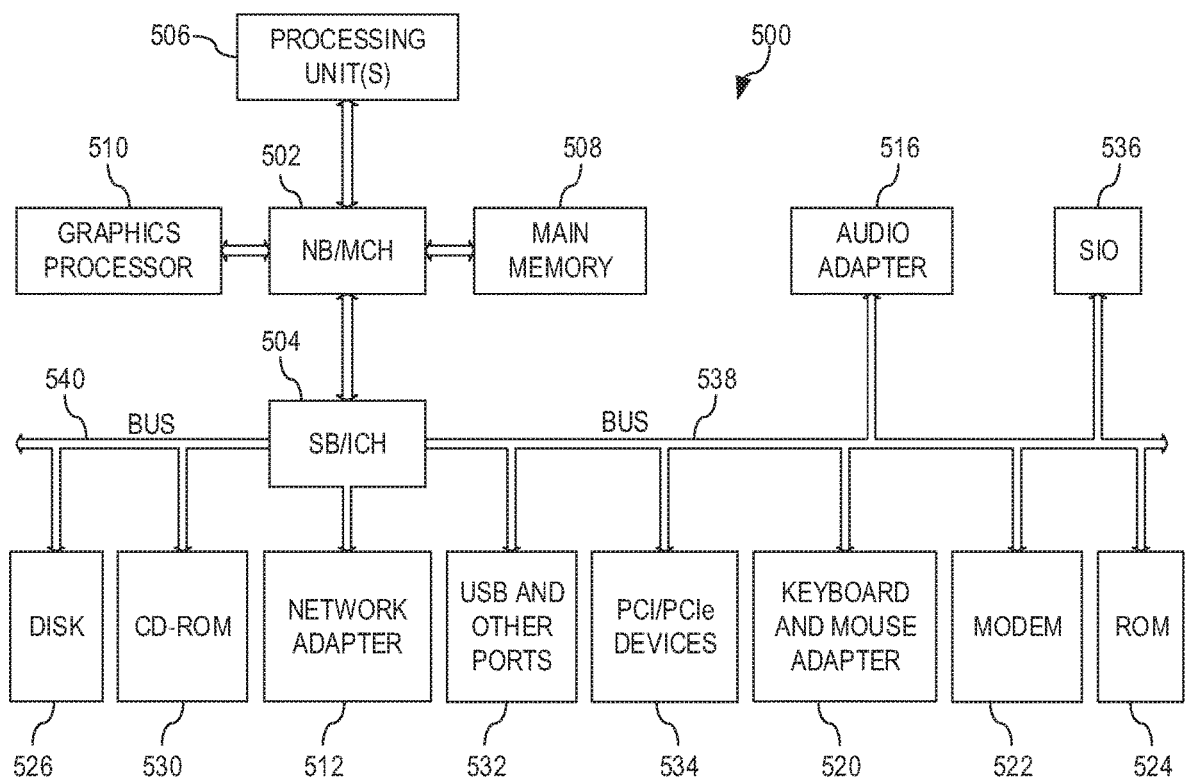
FIG. 5 is an example diagram of a data processing system in which aspects of the illustrative embodiments may be implemented.
Figure 6:
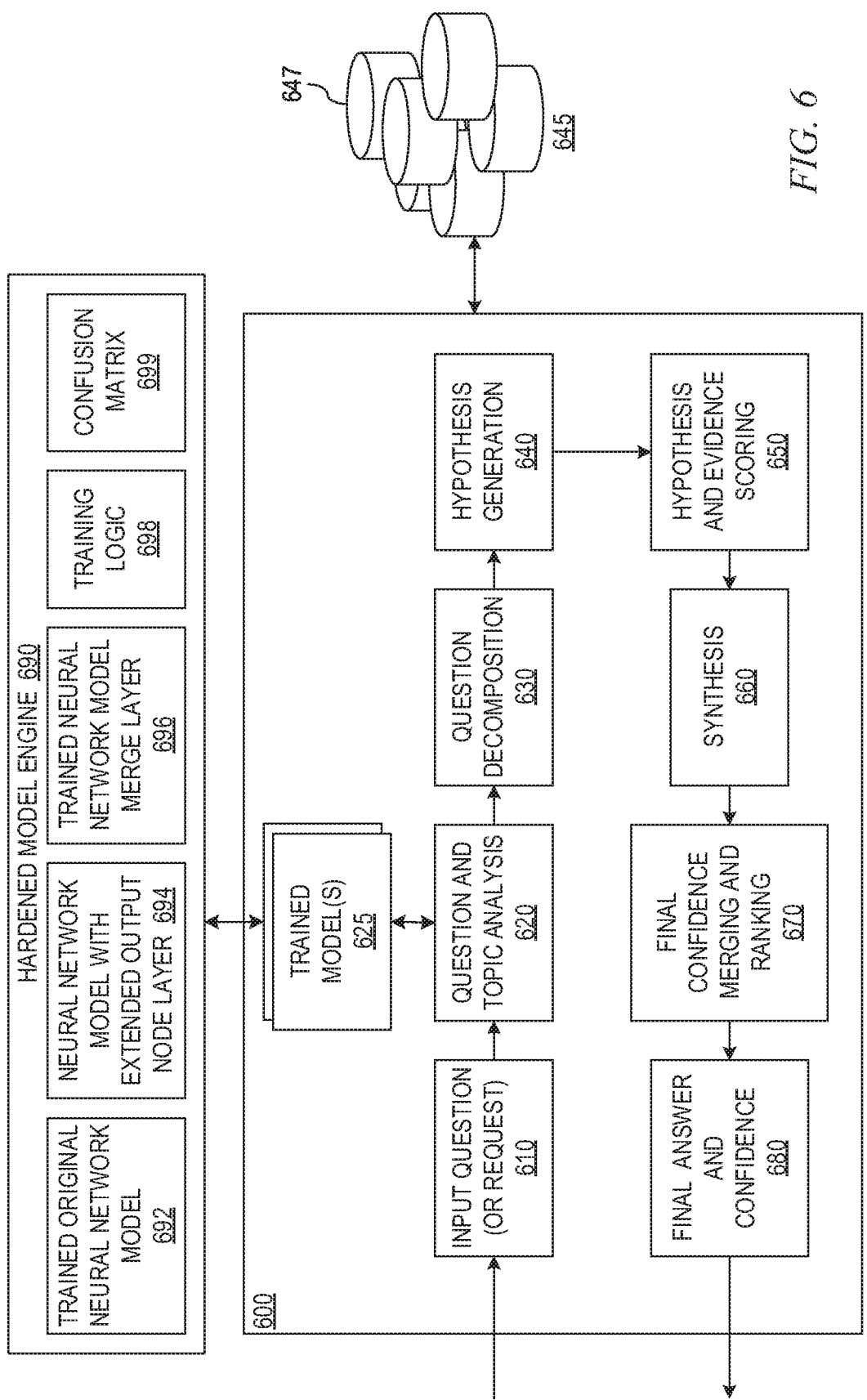
FIG. 6 illustrates a cognitive system processing pipeline in accordance with one illustrative embodiment.

As noted above, the mechanisms of the illustrative embodiments are directed to protecting trained neural network models, machine learning models, deep learning models, and the like, implemented in specialized logic of specially configured computing devices, data processing systems, or the like, of a technological environment. As such, the illustrative embodiments may be utilized in many different types of data processing environments. In order to provide a context for the description of the specific elements and functionality of the illustrative embodiments, FIGS. 4-6 are provided hereafter as example environments in which aspects of the illustrative embodiments may be implemented. It should be appreciated that FIGS. 4-6 are only examples and are not intended to assert or imply any limitation with regard to the environments in which aspects or embodiments of the present invention may be implemented. Many modifications to the depicted environments may be made without departing from the spirit and scope of the present invention.

FIGS. 4-6 are directed to describing an example cognitive system which implements a request processing pipeline, such as a Question Answering (QA) pipeline (also referred to as a Question/Answer pipeline or Question and Answer pipeline) for example, request processing methodology, and request processing computer program product with which the mechanisms of the illustrative embodiments are implemented. These requests may be provided as structured or unstructured request messages, natural language questions, or any other suitable format for requesting an operation to be performed by the cognitive system. In some illustrative embodiments, the requests may be in the form of input data sets that are to be classified in accordance with a cognitive classification operation performed by a machine learning, neural network, deep learning, or other artificial intelligence based model that is implemented by the cognitive system. The input data sets may represent various types of input data depending upon the particular implementation, such as audio input data, image input data, textual input data, or the like. For example, in one possible implementation, the input data set may represent a medical image, such as an x-ray image, CT scan image, MM image, or the like, that is to have portions of the image, or the image as a whole, classified into one or more predefined classifications. In other possible implementations, the input data set may represent facial images, images of text, biometric images, natural language text content, or any other type of input that may be represented as data and for which a classification operation is to be performed so as to perform a cognitive operation by a cognitive system.

It should be appreciated that classification of input data may result in a labeled set of data that has labels or annotations representing the corresponding classes into which the non-labeled input data set is classified. This may be an intermediate step in performing other cognitive operations by the cognitive system that support decision making by human users, e.g., the cognitive system may be a decision support system. For example, in a medical domain, the cognitive system may operate to perform medical image analysis to identify anomalies for identification to a clinician, patient diagnosis and/or treatment recommendation, drug interaction analysis, or any of a plethora of other possible decision support operations. In a security domain, the cognitive system may operate to control access to physical premises, data assets, computing assets, or any other type of asset to which access is to be restricted. In other domains, the cognitive system may perform different types of decision making operations or decision support operations based on the desired implementation.

It should be appreciated that the cognitive system, while shown as having a single request processing pipeline in the examples hereafter, may in fact have multiple request processing pipelines. Each request processing pipeline may be separately trained and/or configured to process requests associated with different domains or be configured to perform the same or different analysis on input requests (or questions in implementations using a QA pipeline), depending on the desired implementation. For example, in some cases, a first request processing pipeline may be trained to operate on input requests directed to a medical image analysis, while a second request processing pipeline may be configured and trained to operate on input requests concerning patient electronic medical record (EMR) analysis involving natural language processing. In other cases, for example, the request processing pipelines may be configured to provide different types of cognitive functions or support different types of applications, such as one request processing pipeline being used for patient treatment recommendation generation, while another pipeline may be trained for financial industry based forecasting, etc.

Moreover, each request processing pipeline may have their own associated corpus or corpora that they ingest and operate on, e.g., one corpus for medical treatment documents and another corpus for financial industry domain related documents in the above examples. In some cases, the request processing pipelines may each operate on the same domain of input questions but may have different configurations, e.g., different annotators or differently trained annotators, such that different analysis and potential answers are generated. The cognitive system may provide additional logic for routing input questions to the appropriate request processing pipeline, such as based on a determined domain of the input request, combining and evaluating final results generated by the processing performed by multiple request processing pipelines, and other control and interaction logic that facilitates the utilization of multiple request processing pipelines.

As noted above, one type of request processing pipeline with which the mechanisms of the illustrative embodiments may be utilized is a Question Answering (QA) pipeline. The description of example embodiments of the present invention hereafter will utilize a QA pipeline as an example of a request processing pipeline that may be augmented to include mechanisms in accordance with one or more illustrative embodiments. It should be appreciated that while the present invention will be described in the context of the cognitive system implementing one or more QA pipelines that operate on an input question, the illustrative embodiments are not limited to such. Rather, the mechanisms of the illustrative embodiments may operate on requests that are not posed as "questions" but are formatted as requests for the cognitive system to perform cognitive operations on a specified set of input data using the associated corpus or corpora and the specific configuration information used to configure the cognitive system. For example, rather than asking a natural language question of "What diagnosis applies to patient P?", the cognitive system may instead receive a request of "generate diagnosis for patient P," or the like. It should be appreciated that the mechanisms of the QA system pipeline may operate on requests in a similar manner to that of input natural language questions with minor modifications. In fact, in some cases, a request may be converted to a natural language question for processing by the QA system pipelines if desired for the particular implementation.

As will be discussed in greater detail hereafter, the illustrative embodiments may be integrated in, augment, and extend the functionality of these QA pipeline, or request processing pipeline, mechanisms to protect the models implemented in these pipelines, or by the cognitive system as a whole, from gradient based attacks, such as an evasion attack or the like. In particular, in portions of the cognitive system in which the trained neural network models, machine learning models, deep learning models, or the like, are employed to generate labeled data set outputs, the mechanisms of the illustrative embodiments may be implemented to train the neural network or other machine learning or cognitive model so as to introduce noise into the probability values generated by the trained neural network or model to thereby modify the loss surface of the neural network and make a correct gradient selection for generating an adversarial input difficult for an attacker.

As the mechanisms of the illustrative embodiments may be part of a cognitive system and may improve the operation of the cognitive system by protecting it from model stealing attacks, it is important to first have an understanding of how cognitive systems and question and answer creation in a cognitive system implementing a QA pipeline is implemented before describing how the mechanisms of the illustrative embodiments are integrated in and augment such cognitive systems and request processing pipeline, or QA pipeline, mechanisms. It should be appreciated that the mechanisms described in FIGS. 4-6 are only examples and are not intended to state or imply any limitation with regard to the type of cognitive system mechanisms with which the illustrative embodiments are implemented. Many modifications to the example cognitive system shown in FIGS. 4-6 may be implemented in various embodiments of the present invention without departing from the spirit and scope of the present invention.

As an overview, a cognitive system is a specialized computer system, or set of computer systems, configured with hardware and/or software logic (in combination with hardware logic upon which the software executes) to emulate human cognitive functions. These cognitive systems apply human-like characteristics to conveying and manipulating ideas which, when combined with the inherent strengths of digital computing, can solve problems with high accuracy and resilience on a large scale. A cognitive system performs one or more computer-implemented cognitive operations that approximate a human thought process as well as enable people and machines to interact in a more natural manner so as to extend and magnify human expertise and cognition. A cognitive system comprises artificial intelligence logic, such as natural language processing (NLP) based logic, for example, and machine learning logic, which may be provided as specialized hardware, software executed on hardware, or any combination of specialized hardware and software executed on hardware. This logic may implement one or more models, such as a neural network model, a machine learning model, a deep learning model, that may be trained for particular purposes for supporting the particular cognitive operations performed by the cognitive system. In accordance with the mechanisms of the illustrative embodiments, the logic further implements a hardened model engine for training the model, e.g., neural network, using the three different training data sets mentioned above, and modifying the model (e.g., neural network) to provide a modified and extended neural network that includes additional output nodes and a merge layer. In this way, the hardened model engine fortifies the neural network from gradient based attacks.

The logic of the cognitive system implements the cognitive computing operation(s), examples of which include, but are not limited to, question answering, identification of related concepts within different portions of content in a corpus, security operations for controlling access to premises or assets, intelligent search algorithms, such as Internet web page searches, for example, medical diagnostic and treatment recommendations, other types of recommendation generation, e.g., items of interest to a particular user, potential new contact recommendations, etc., image analysis, audio analysis, and the like. The types and number of cognitive operations that may be implemented using the cognitive system of the illustrative embodiments are vast and cannot all be documented herein. Any cognitive computing operation emulating decision making and analysis performed by human beings, but in an artificial intelligence or cognitive computing manner, is intended to be within the spirit and scope of the present invention.

IBM Watson™ is an example of one such cognitive computing system which can process human readable language and identify inferences between text passages with human-like high accuracy at speeds far faster than human beings and on a larger scale. In general, such cognitive systems are able to perform the following functions:

Navigate the complexities of human language and understanding

Ingest and process vast amounts of structured and unstructured data

Generate and evaluate hypothesis

Weigh and evaluate responses that are based only on relevant evidence

Provide situation-specific advice, insights, and guidance

Improve knowledge and learn with each iteration and interaction through machine learning processes Enable decision making at the point of impact (contextual guidance)

Scale in proportion to the task

Extend and magnify human expertise and cognition

Identify resonating, human-like attributes and traits from natural language

Deduce various language specific or agnostic attributes from natural language

High degree of relevant recollection from data points (images, text, voice) (memorization and recall)

Predict and sense with situational awareness that mimic human cognition based on experiences Answer questions based on natural language and specific evidence In one aspect, cognitive computing systems (or simply "cognitive systems") provide mechanisms for answering questions posed to these cognitive systems using a Question Answering pipeline or system (QA system) and/or process requests which may or may not be posed as natural language questions. The QA pipeline or system is an artificial intelligence application executing on data processing hardware that answers questions pertaining to a given subject-matter domain presented in natural language. The QA pipeline receives inputs from various sources including input over a network, a corpus of electronic documents or other data, data from a content creator, information from one or more content users, and other such inputs from other possible sources of input. Data storage devices store the corpus of data. A content creator creates content in a document for use as part of a corpus of data with the QA pipeline. The document may include any file, text, article, or source of data for use in the QA system. For example, a QA pipeline accesses a body of knowledge about the domain, or subject matter area, e.g., financial domain, medical domain, legal domain, etc., where the body of knowledge (knowledgebase) can be organized in a variety of configurations, e.g., a structured repository of domain-specific information, such as ontologies, or unstructured data related to the domain, or a collection of natural language documents about the domain.

Content users input questions to cognitive system which implements the QA pipeline. The QA pipeline then answers the input questions using the content in the corpus of data by evaluating documents, sections of documents, portions of data in the corpus, or the like. When a process evaluates a given section of a document for semantic content, the process can use a variety of conventions to query such document from the QA pipeline, e.g., sending the query to the QA pipeline as a well-formed question which is then interpreted by the QA pipeline and a response is provided containing one or more answers to the question. Semantic content is content based on the relation between signifiers, such as words, phrases, signs, and symbols, and what they stand for, their denotation, or connotation. In other words, semantic content is content that interprets an expression, such as by using Natural Language Processing.

As will be described in greater detail hereafter, the QA pipeline receives an input question, parses the question to extract the major features of the question, uses the extracted features to formulate queries, and then applies those queries to the corpus of data. Based on the application of the queries to the corpus of data, the QA pipeline generates a set of hypotheses, or candidate answers to the input question, by looking across the corpus of data for portions of the corpus of data that have some potential for containing a valuable response to the input question. The QA pipeline then performs deep analysis on the language of the input question and the language used in each of the portions of the corpus of data found during the application of the queries using a variety of reasoning algorithms. There may be hundreds or even thousands of reasoning algorithms applied, each of which performs different analysis, e.g., comparisons, natural language analysis, lexical analysis, or the like, and generates a score. For example, some reasoning algorithms may look at the matching of terms and synonyms within the language of the input question and the found portions of the corpus of data. Other reasoning algorithms may look at temporal or spatial features in the language, while others may evaluate the source of the portion of the corpus of data and evaluate its veracity.

The scores obtained from the various reasoning algorithms indicate the extent to which the potential response is inferred by the input question based on the specific area of focus of that reasoning algorithm. Each resulting score is then weighted against a statistical model. The statistical model captures how well the reasoning algorithm performed at establishing the inference between two similar passages for a particular domain during the training period of the QA pipeline. The statistical model is used to summarize a level of confidence that the QA pipeline has regarding the evidence that the potential response, i.e. candidate answer, is inferred by the question. This process is repeated for each of the candidate answers until the QA pipeline identifies candidate answers that surface as being significantly stronger than others and thus, generates a final answer, or ranked set of answers, for the input question.

As mentioned above, QA pipeline mechanisms operate by accessing information from a corpus of data or information (also referred to as a corpus of content), analyzing it, and then generating answer results based on the analysis of this data. Accessing information from a corpus of data typically includes: a database query that answers questions about what is in a collection of structured records, and a search that delivers a collection of document links in response to a query against a collection of unstructured data (text, markup language, etc.). Conventional question answering systems are capable of generating answers based on the corpus of data and the input question, verifying answers to a collection of questions for the corpus of data, correcting errors in digital text using a corpus of data, and selecting answers to questions from a pool of potential answers, i.e. candidate answers.

Content creators, such as article authors, electronic document creators, web page authors, document database creators, and the like, determine use cases for products, solutions, and services described in such content before writing their content. Consequently, the content creators know what questions the content is intended to answer in a particular topic addressed by the content. Categorizing the questions, such as in terms of roles, type of information, tasks, or the like, associated with the question, in each document of a corpus of data allows the QA pipeline to more quickly and efficiently identify documents containing content related to a specific query. The content may also answer other questions that the content creator did not contemplate that may be useful to content users. The questions and answers may be verified by the content creator to be contained in the content for a given document. These capabilities contribute to improved accuracy, system performance, machine learning, and confidence of the QA pipeline. Content creators, automated tools, or the like, annotate or otherwise generate metadata for providing information useable by the QA pipeline to identify these question and answer attributes of the content.

Operating on such content, the QA pipeline generates answers for input questions using a plurality of intensive analysis mechanisms which evaluate the content to identify the most probable answers, i.e. candidate answers, for the input question. The most probable answers are output as a ranked listing of candidate answers ranked according to their relative scores or confidence measures calculated during evaluation of the candidate answers, as a single final answer having a highest ranking score or confidence measure, or which is a best match to the input question, or a combination of ranked listing and final answer.

FIG. 4 depicts a schematic diagram of one illustrative embodiment of a cognitive system 400 implementing a request processing pipeline 408, which in some embodiments may be a question answering (QA) pipeline, in a computer network 402. For purposes of the present description, it will be assumed that the request processing pipeline 408 is implemented as a QA pipeline that operates on structured and/or unstructured requests in the form of input questions. One example of a question processing operation which may be used in conjunction with the principles described herein is described in U.S. Patent Application Publication No. 2011/0125734, which is herein incorporated by reference in its entirety. The cognitive system 400 is implemented on one or more computing devices 404A-D (comprising one or more processors and one or more memories, and potentially any other computing device elements generally known in the art including buses, storage devices, communication interfaces, and the like) connected to the computer network 402. For purposes of illustration only, FIG. 4 depicts the cognitive system 400 being implemented on computing device 404A only, but as noted above the cognitive system 400 may be distributed across multiple computing devices, such as a plurality of computing devices 404A-D. The network 402 includes multiple computing devices 404A-D, which may operate as server computing devices, and 410-412 which may operate as client computing devices, in communication with each other and with other devices or components via one or more wired and/or wireless data communication links, where each communication link comprises one or more of wires, routers, switches, transmitters, receivers, or the like. In some illustrative embodiments, the cognitive system 400 and network 402 enables question processing and answer generation (QA) functionality for one or more cognitive system users via their respective computing devices 410-412. In other embodiments, the cognitive system 400 and network 402 may provide other types of cognitive operations including, but not limited to, request processing and cognitive response generation which may take many different forms depending upon the desired implementation, e.g., cognitive information retrieval, training/instruction of users, cognitive evaluation of data, or the like. Other embodiments of the cognitive system 400 may be used with components, systems, subsystems, and/or devices other than those that are depicted herein.

The cognitive system 400 is configured to implement a request processing pipeline 408 that receive inputs from various sources. The requests may be posed in the form of a natural language question, natural language request for information, natural language request for the performance of a cognitive operation, or the like. Alternatively, the "request" may simply be the input of data that is intended to be operated on by the cognitive system, e.g., images, text, audio input, or the like, which is to be classified by the hardened model of the illustrative embodiments and then operated on by cognitive processes to generate a result of a cognitive operation. For example, the cognitive system 400 receives input from the network 402, a corpus or corpora of electronic documents 406, cognitive system users, image capture devices, audio capture devices, biometric scanners, textual message interception devices, and/or other data sources and other possible sources of input.

In one embodiment, some or all of the inputs to the cognitive system 400 are routed through the network 402. The various computing devices 404A-D on the network 402 include access points for content creators and cognitive system users. Some of the computing devices 404A-D include devices for a database storing the corpus or corpora of data 406 (which is shown as a separate entity in FIG. 4 for illustrative purposes only). Portions of the corpus or corpora of data 406 may also be provided on one or more other network attached storage devices, in one or more databases, or other computing devices not explicitly shown in FIG. 4. The network 402 includes local network connections and remote connections in various embodiments, such that the cognitive system 400 may operate in environments of any size, including local and global, e.g., the Internet.

Depending on the particular domain and implementation of the cognitive system, the corpus or corpora of data 406 may take many different forms. In a natural language implementation, the corpus or corpora 406 may be composed of natural language unstructured documents, structured documents, or the like. In a domain in which image analysis is being performed, the corpus or corpora 406 may include image data for various types of entities. In an audio analysis domain, the corpus or corpora 406 may contain audio patterns representing different entities or sources of audible sounds. The content of the corpus or corpora 406 may vary depending on the type of data needed to perform cognitive operations.

In one embodiment, the content creator creates content in a document of the corpus or corpora of data 406 for use as part of a corpus of data with the cognitive system 400. The document includes any file, text, article, or source of data for use in the cognitive system 400. Cognitive system users access the cognitive system 400 via a network connection or an Internet connection to the network 402, and input questions/requests to the cognitive system 400 that are answered/processed based on the content in the corpus or corpora of data 406. In one embodiment, the questions/requests are formed using natural language. The cognitive system 400 parses and interprets the question/request via a pipeline 408, and provides a response to the cognitive system user, e.g., cognitive system user client computing device 410, containing one or more answers to the question posed, response to the request, results of processing the request, or the like. In some embodiments, the cognitive system 400 provides a response to users in a ranked list of candidate answers/responses while in other illustrative embodiments, the cognitive system 400 provides a single final answer/response or a combination of a final answer/response and ranked listing of other candidate answers/responses.

The cognitive system 400 implements the pipeline 408 which comprises a plurality of stages for processing an input question/request based on information obtained from the corpus or corpora of data 406. The pipeline 408 generates answers/responses for the input question or request based on the processing of the input question/request and the corpus or corpora of data 406. The pipeline 408 will be described in greater detail hereafter with regard to FIG. 6.

In some illustrative embodiments, the cognitive system 400 may be the IBM Watson™ cognitive system available from International Business Machines Corporation of Armonk, N.Y., which is augmented with the mechanisms of the illustrative embodiments described hereafter. As outlined previously, a pipeline of the IBM Watson™ cognitive system receives an input question or request which it then parses to extract the major features of the question/request, which in turn are then used to formulate queries that are applied to the corpus or corpora of data 406. Based on the application of the queries to the corpus or corpora of data 406, a set of hypotheses, or candidate answers/responses to the input question/request, are generated by looking across the corpus or corpora of data 406 for portions of the corpus or corpora of data 406 (hereafter referred to simply as the corpus 406) that have some potential for containing a valuable response to the input question/response (hereafter assumed to be an input question). The pipeline 408 of the IBM Watson™ cognitive system then performs deep analysis on the language of the input question and the language used in each of the portions of the corpus 406 found during the application of the queries using a variety of reasoning algorithms.

The scores obtained from the various reasoning algorithms are then weighted against a statistical model that summarizes a level of confidence that the pipeline 408 of the IBM Watson™ cognitive system 400, in this example, has regarding the evidence that the potential candidate answer is inferred by the question. This process is be repeated for each of the candidate answers to generate ranked listing of candidate answers which may then be presented to the user that submitted the input question, e.g., a user of client computing device 410, or from which a final answer is selected and presented to the user. More information about the pipeline 408 of the IBM Watson™ cognitive system 400 may be obtained, for example, from the IBM Corporation website, IBM Redbooks, and the like. For example, information about the pipeline of the IBM Watson™ cognitive system can be found in Yuan et al., "Watson and Healthcare," IBM developerWorks, 2011 and "The Era of Cognitive Systems: An Inside Look at IBM Watson and How it Works" by Rob High, IBM Redbooks, 2012.

As noted above, while the input to the cognitive system 400 from a client device may be posed in the form of a natural language question, the illustrative embodiments are not limited to such. Rather, the input question may in fact be formatted or structured as any suitable type of request, or simply as a set of input data to be processed, which may be parsed and analyzed using structured and/or unstructured input analysis, including but not limited to the natural language parsing and analysis mechanisms of a cognitive system such as IBM Watson™, to determine the basis upon which to perform cognitive analysis and providing a result of the cognitive analysis. Such processing may alternatively, or in addition, include image analysis, audio analysis, textual image analysis, biometrics analysis, or any other type of cognitive analysis that utilizes neural network, machine learning, or other cognitive models which may be trained and hardened against gradient based attacks in accordance with the illustrative embodiments.

Regardless of the manner by which the question or request is input to the cognitive system 300, the processing of the request or question involves the application of a trained model, e.g., neural network model, machine learning model, deep learning (cognitive) model, etc., to an input data set as described previously above. This input data set may represent features of the actual request or question itself, data submitted along with the request or question upon which processing is to be performed, or the like. The application of the trained model to an input data set may occur at various points during the performance of the cognitive computing operations by the cognitive system. For example, the trained model may be utilized during feature extraction and classification by a feature extraction stage of processing of the request or input question, e.g., taking a natural language term in the request or question and classifying it as one of a plurality of possible concepts that the term corresponds to, e.g., classifying the term "truck" in an input question or request into a plurality of possible classes, one of which may be "vehicle". As another example, a portion of an image comprising a plurality of pixel data may have the trained model applied to it to determine what the object is that is in the portion of the image. The mechanisms of the illustrative embodiments operate on the output of the trained model as discussed previously above, which may be an intermediate operation within the overall cognitive system's cognitive computing operations, e.g., classification of a portion of a medical image into one of a plurality of different anatomical structures may be an intermediate operation to performing an anomaly identification and treatment recommendation cognitive computing operation.

As shown in FIG. 1, the cognitive system 400 is further augmented, in accordance with the mechanisms of the illustrative embodiments, to include logic implemented in specialized hardware, software executed on hardware, or any combination of specialized hardware and software executed on hardware, for implementing a hardened model engine 420. The hardened model engine 420 may be provided as an external engine to the logic implementing the trained model 460. The hardened model engine 320 operates modify and re-train or create a new protected neural network based on a given trained neural network. This is accomplished, as described above, by re-training the output nodes of the neural network using the original training data and noisy training data to thereby introduce noise in the loss surface associated with the neural network. The training based on the noisy training data set is specifically designed to cause the neural network to misclassify the noisy training data. The neural network is further modified to include a second set of output nodes that are trained according to an adversarial training data set and to include a merge layer of nodes to merge the outputs of the first output nodes and the second output nodes. The hardened model engine 420 further utilizes a confusion matrix to select the classifications to use for causing the neural network to be trained to misclassify the noisy training data.

The resulting modified output vector generated by the merging of the outputs of the two sets of output nodes provides modified probability values while maintaining the correctness of the classification and associated labels that are associated with the input data in a labeled data set. Thus, correct classification and labeling of the input data set is still performed while protecting or hardening the neural network (model) against gradient based attacks, such as evasion attacks. The resulting classified or labeled data set may be provided to further stages of processing downstream in the pipeline 408 for further processing and performance of the overall cognitive operation for which the cognitive system 400 is employed.

Thus, an attacker, such as a user of client computing device 410 or the like, is not able to correctly identify the gradient of the actual loss surface of the neural network so as to be able to generate adversarial input that would fool the classification performed by the neural network, i.e. hardened model 460. To the contrary, the training performed by the mechanisms of the illustrative embodiments redirect the gradient towards a noisy portion of the loss surface and away from the actual gradient of the original loss surface. As a result, the attacker is not able to ascertain a correct gradient and hence, is unable to generate adversarial input data based on a correct gradient.

It should be appreciated that while FIG. 4 illustrates the implementation of the trained and hardened model logic 460 as part of a cognitive system 400, the illustrative embodiments are not limited to such. Rather, in some illustrative embodiments, the trained model logic 460 itself may be provided as a service from which a user of a client computing device 410, may request processing of an input data set. Moreover, other providers of services, which may include other cognitive systems, may utilize such a trained model 460 to augment the operation of their own cognitive systems. Thus, in some illustrative embodiments the trained model logic 460 may be implemented in one or more server computing devices, accessed via one or more APIs via other computing devices through which input data sets are submitted to the trained model logic 460, and corresponding labeled data sets are returned. Thus, the integration of the mechanisms of the illustrative embodiments into a cognitive system 400 is not required, but may be performed depending on the desired implementation.

As noted above, the mechanisms of the illustrative embodiments are rooted in the computer technology arts and are implemented using logic present in such computing or data processing systems. These computing or data processing systems are specifically configured, either through hardware, software, or a combination of hardware and software, to implement the various operations described above. As such, FIG. 5 is provided as an example of one type of data processing system in which aspects of the present invention may be implemented. Many other types of data processing systems may be likewise configured to specifically implement the mechanisms of the illustrative embodiments.

FIG. 5 is a block diagram of an example data processing system in which aspects of the illustrative embodiments are implemented. Data processing system 500 is an example of a computer, such as a server computing device 404A-D or client computing device 410 in FIG. 4, in which computer usable code or instructions implementing the processes for illustrative embodiments of the present invention are located. In one illustrative embodiment, FIG. 5 represents a server computing device, such as a server computing device 404A, which implements a cognitive system 400 and request or QA system pipeline 408 augmented to include the additional mechanisms of the illustrative embodiments described herein with regard to a hardened model engine 420 for protecting the trained neural network, machine learning, deep learning, or other artificial intelligence model logic from gradient based attacks.

In the depicted example, data processing system 500 employs a hub architecture including north bridge and memory controller hub (NB/MCH) 502 and south bridge and input/output (I/O) controller hub (SB/ICH) 504. Processing unit 506, main memory 508, and graphics processor 510 are connected to NB/MCH 502. Graphics processor 510 is connected to NB/MCH 502 through an accelerated graphics port (AGP).

In the depicted example, local area network (LAN) adapter 512 connects to SB/ICH 504. Audio adapter 516, keyboard and mouse adapter 520, modem 522, read only memory (ROM) 524, hard disk drive (HDD) 526, CD-ROM drive 530, universal serial bus (USB) ports and other communication ports 532, and PCI/PCIe devices 534 connect to SB/ICH 504 through bus 538 and bus 540. PCI/PCIe devices may include, for example, Ethernet adapters, add-in cards, and PC cards for notebook computers. PCI uses a card bus controller, while PCIe does not. ROM 524 may be, for example, a flash basic input/output system (BIOS).

HDD 526 and CD-ROM drive 530 connect to SB/ICH 504 through bus 540. HDD 526 and CD-ROM drive 530 may use, for example, an integrated drive electronics (IDE) or serial advanced technology attachment (SATA) interface. Super I/O (SIO) device 536 is connected to SB/ICH 504.

An operating system runs on processing unit 506. The operating system coordinates and provides control of various components within the data processing system 500 in FIG. 5. As a client, the operating system is a commercially available operating system such as Microsoft® Windows 10®. An object-oriented programming system, such as the Java™ programming system, may run in conjunction with the operating system and provides calls to the operating system from Java™ programs or applications executing on data processing system 500.

As a server, data processing system 500 may be, for example, an IBM® eServer™ System P® computer system, running the Advanced Interactive Executive (AIX®) operating system or the LINUX® operating system. Data processing system 500 may be a symmetric multiprocessor (SMP) system including a plurality of processors in processing unit 506. Alternatively, a single processor system may be employed.

Instructions for the operating system, the object-oriented programming system, and applications or programs are located on storage devices, such as HDD 526, and are loaded into main memory 508 for execution by processing unit 506. The processes for illustrative embodiments of the present invention are performed by processing unit 506 using computer usable program code, which is located in a memory such as, for example, main memory 508, ROM 524, or in one or more peripheral devices 526 and 530, for example.

A bus system, such as bus 538 or bus 540 as shown in FIG. 5, is comprised of one or more buses. Of course, the bus system may be implemented using any type of communication fabric or architecture that provides for a transfer of data between different components or devices attached to the fabric or architecture. A communication unit, such as modem 522 or network adapter 512 of FIG. 5, includes one or more devices used to transmit and receive data. A memory may be, for example, main memory 508, ROM 524, or a cache such as found in NB/MCH 502 in FIG. 5.

Those of ordinary skill in the art will appreciate that the hardware depicted in FIGS. 4 and 5 may vary depending on the implementation. Other internal hardware or peripheral devices, such as flash memory, equivalent non-volatile memory, or optical disk drives and the like, may be used in addition to or in place of the hardware depicted in FIGS. 4 and 5. Also, the processes of the illustrative embodiments may be applied to a multiprocessor data processing system, other than the SMP system mentioned previously, without departing from the spirit and scope of the present invention.

Moreover, the data processing system 500 may take the form of any of a number of different data processing systems including client computing devices, server computing devices, a tablet computer, laptop computer, telephone or other communication device, a personal digital assistant (PDA), or the like. In some illustrative examples, data processing system 500 may be a portable computing device that is configured with flash memory to provide non-volatile memory for storing operating system files and/or user-generated data, for example. Essentially, data processing system 500 may be any known or later developed data processing system without architectural limitation.

FIG. 6 illustrates an example of a cognitive system processing pipeline which, in the depicted example, is a question and answer (QA) system pipeline used to process an input question in accordance with one illustrative embodiment. As noted above, the cognitive systems with which the illustrative embodiments may be utilized are not limited to QA systems and thus, not limited to the use of a QA system pipeline. FIG. 6 is provided only as one example of the processing structure that may be implemented to process a natural language input requesting the operation of a cognitive system to present a response or result to the natural language input.

The QA system pipeline of FIG. 6 may be implemented, for example, as QA pipeline 408 of cognitive system 400 in FIG. 4. It should be appreciated that the stages of the QA pipeline shown in FIG. 6 are implemented as one or more software engines, components, or the like, which are configured with logic for implementing the functionality attributed to the particular stage. Each stage is implemented using one or more of such software engines, components or the like. The software engines, components, etc. are executed on one or more processors of one or more data processing systems or devices and utilize or operate on data stored in one or more data storage devices, memories, or the like, on one or more of the data processing systems. The QA pipeline of FIG. 6 is augmented, for example, in one or more of the stages to implement the improved mechanism of the illustrative embodiments described hereafter, additional stages may be provided to implement the improved mechanism, or separate logic from the pipeline 600 may be provided for interfacing with the pipeline 600 and implementing the improved functionality and operations of the illustrative embodiments.

As shown in FIG. 6, the QA pipeline 600 comprises a plurality of stages 610-680 through which the cognitive system operates to analyze an input question and generate a final response. In an initial question input stage 610, the QA pipeline 600 receives an input question that is presented in a natural language format. That is, a user inputs, via a user interface, an input question for which the user wishes to obtain an answer, e.g., "Who are Washington's closest advisors?" In response to receiving the input question, the next stage of the QA pipeline 600, i.e. the question and topic analysis stage 620, parses the input question using natural language processing (NLP) techniques to extract major features from the input question, and classify the major features according to types, e.g., names, dates, or any of a plethora of other defined topics. For example, in the example question above, the term "who" may be associated with a topic for "persons" indicating that the identity of a person is being sought, "Washington" may be identified as a proper name of a person with which the question is associated, "closest" may be identified as a word indicative of proximity or relationship, and "advisors" may be indicative of a noun or other language topic.

In addition, the extracted major features include key words and phrases classified into question characteristics, such as the focus of the question, the lexical answer type (LAT) of the question, and the like. As referred to herein, a lexical answer type (LAT) is a word in, or a word inferred from, the input question that indicates the type of the answer, independent of assigning semantics to that word. For example, in the question "What maneuver was invented in the 1500s to speed up the game and involves two pieces of the same color?," the LAT is the string "maneuver." The focus of a question is the part of the question that, if replaced by the answer, makes the question a standalone statement. For example, in the question "What drug has been shown to relieve the symptoms of ADD with relatively few side effects?," the focus is "drug" since if this word were replaced with the answer, e.g., the answer "Adderall" can be used to replace the term "drug" to generate the sentence "Adderall has been shown to relieve the symptoms of ADD with relatively few side effects." The focus often, but not always, contains the LAT. On the other hand, in many cases it is not possible to infer a meaningful LAT from the focus.

The classification of the extracted features from the input question may be performed using one or more trained models 625 which may be implemented, for example, as neural network models, machine learning models, deep learning models, or other type of artificial intelligence based model. As noted above, the mechanisms of the illustrative embodiments may be implemented at the question and topic analysis stage 620 with regard to the classification of the extracted features of the input question by such trained models 625. That is, the illustrative embodiments provide the hardened model engine 690 which trains the trained model 625 to harden the trained model 625 against gradient attacks. The trained model 625 operates in its normal capacity on the input data, e.g., operating on the extracted features from the input question to classify the extracted features, i.e. the input data, and thereby output labeled features to the question decomposition stage 630 for further analysis. Thus, the trained models 625 still provide correct classification downstream along the QA system pipeline 600, however, any attacker attempting to perform a gradient based attack against the trained models 625 will be unable to ascertain a correct gradient of the loss surface of the trained models 625 to be able to generate an adversarial input that would cause the trained models 625 to misclassify the input.

It should be appreciated that the input data, in some illustrative embodiments, need not be a formulated request or question, either structure or unstructured, but instead may simply be an input data set that is input with the implied request that the input data set be processed by the pipeline 600. For example, in embodiments where the pipeline 600 is configured to perform image analysis cognitive operations, input images may be provided as input to the pipeline 600 which extracts major features of the input images, classifies them according to the trained model 625, and performs other processing of the pipeline 600 as described hereafter to score the hypotheses as to what is shown in the image, to thereby generate a final result output. In other cases, audio input data may also be analyzed in a similar manner. Regardless of the nature of the input data being processed, the mechanisms of the illustrative embodiments may be employed to train the trained models 625 to be hardened against gradient based attacks.

Referring again to FIG. 6, the identified major features are then used during the question decomposition stage 630 to decompose the question into one or more queries that are applied to the corpora of data/information 645 in order to generate one or more hypotheses. The queries are generated in any known or later developed query language, such as the Structure Query Language (SQL), or the like. The queries are applied to one or more databases storing information about the electronic texts, documents, articles, websites, and the like, that make up the corpora of data/information 645. That is, these various sources themselves, different collections of sources, and the like, represent a different corpus 647 within the corpora 645. There may be different corpora 647 defined for different collections of documents based on various criteria depending upon the particular implementation. For example, different corpora may be established for different topics, subject matter categories, sources of information, or the like. As one example, a first corpus may be associated with healthcare documents while a second corpus may be associated with financial documents. Alternatively, one corpus may be documents published by the U.S. Department of Energy while another corpus may be IBM Redbooks documents. Still further, some corpora may be comprised of image data, audio data, or the like. Any collection of content having some similar attribute may be considered to be a corpus 647 within the corpora 645.

The queries are applied to one or more databases storing information about the electronic texts, documents, articles, websites, and the like, that make up the corpus of data/information, e.g., the corpus of data 406 in FIG. 4. The queries are applied to the corpus of data/information at the hypothesis generation stage 640 to generate results identifying potential hypotheses for answering the input question, which can then be evaluated. That is, the application of the queries results in the extraction of portions of the corpus of data/information matching the criteria of the particular query. These portions of the corpus are then analyzed and used, during the hypothesis generation stage 640, to generate hypotheses for answering the input question. These hypotheses are also referred to herein as "candidate answers" for the input question. For any input question, at this stage 640, there may be hundreds of hypotheses or candidate answers generated that may need to be evaluated.

The QA pipeline 600, in stage 650, then performs a deep analysis and comparison of the language of the input question and the language of each hypothesis or "candidate answer," as well as performs evidence scoring to evaluate the likelihood that the particular hypothesis is a correct answer for the input question. As mentioned above, this involves using a plurality of reasoning algorithms, each performing a separate type of analysis of the language of the input question and/or content of the corpus that provides evidence in support of, or not in support of, the hypothesis. Each reasoning algorithm generates a score based on the analysis it performs which indicates a measure of relevance of the individual portions of the corpus of data/information extracted by application of the queries as well as a measure of the correctness of the corresponding hypothesis, i.e. a measure of confidence in the hypothesis. There are various ways of generating such scores depending upon the particular analysis being performed. In generally, however, these algorithms look for particular terms, phrases, or patterns of text that are indicative of terms, phrases, or patterns of interest and determine a degree of matching with higher degrees of matching being given relatively higher scores than lower degrees of matching.

Thus, for example, an algorithm may be configured to look for the exact term from an input question or synonyms to that term in the input question, e.g., the exact term or synonyms for the term "movie," and generate a score based on a frequency of use of these exact terms or synonyms. In such a case, exact matches will be given the highest scores, while synonyms may be given lower scores based on a relative ranking of the synonyms as may be specified by a subject matter expert (person with knowledge of the particular domain and terminology used) or automatically determined from frequency of use of the synonym in the corpus corresponding to the domain. Thus, for example, an exact match of the term "movie" in content of the corpus (also referred to as evidence, or evidence passages) is given a highest score. A synonym of movie, such as "motion picture" may be given a lower score but still higher than a synonym of the type "film" or "moving picture show." Instances of the exact matches and synonyms for each evidence passage may be compiled and used in a quantitative function to generate a score for the degree of matching of the evidence passage to the input question.

Thus, for example, a hypothesis or candidate answer to the input question of "What was the first movie?" is "The Horse in Motion." If the evidence passage contains the statements "The first motion picture ever made was 'The Horse in Motion' in 1878 by Eadweard Muybridge. It was a movie of a horse running," and the algorithm is looking for exact matches or synonyms to the focus of the input question, i.e. "movie," then an exact match of "movie" is found in the second sentence of the evidence passage and a highly scored synonym to "movie," i.e. "motion picture," is found in the first sentence of the evidence passage. This may be combined with further analysis of the evidence passage to identify that the text of the candidate answer is present in the evidence passage as well, i.e. "The Horse in Motion." These factors may be combined to give this evidence passage a relatively high score as supporting evidence for the candidate answer "The Horse in Motion" being a correct answer.

It should be appreciated that this is just one simple example of how scoring can be performed. Many other algorithms of various complexity may be used to generate scores for candidate answers and evidence without departing from the spirit and scope of the present invention.

In the synthesis stage 660, the large number of scores generated by the various reasoning algorithms are synthesized into confidence scores or confidence measures for the various hypotheses. This process involves applying weights to the various scores, where the weights have been determined through training of the statistical model employed by the QA pipeline 600 and/or dynamically updated. For example, the weights for scores generated by algorithms that identify exactly matching terms and synonym may be set relatively higher than other algorithms that are evaluating publication dates for evidence passages. The weights themselves may be specified by subject matter experts or learned through machine learning processes that evaluate the significance of characteristics evidence passages and their relative importance to overall candidate answer generation.

The weighted scores are processed in accordance with a statistical model generated through training of the QA pipeline 600 that identifies a manner by which these scores may be combined to generate a confidence score or measure for the individual hypotheses or candidate answers. This confidence score or measure summarizes the level of confidence that the QA pipeline 600 has about the evidence that the candidate answer is inferred by the input question, i.e. that the candidate answer is the correct answer for the input question.

The resulting confidence scores or measures are processed by a final confidence merging and ranking stage 670 which compares the confidence scores and measures to each other, compares them against predetermined thresholds, or performs any other analysis on the confidence scores to determine which hypotheses/candidate answers are the most likely to be the correct answer to the input question. The hypotheses/candidate answers are ranked according to these comparisons to generate a ranked listing of hypotheses/candidate answers (hereafter simply referred to as "candidate answers"). From the ranked listing of candidate answers, at stage 680, a final answer and confidence score, or final set of candidate answers and confidence scores, are generated and output to the submitter of the original input question via a graphical user interface or other mechanism for outputting information.

As shown in FIG. 6, the hardened model engine 690 provides training logic 698 that implements the training methodology and mechanisms previously discussed above to modify an original trained model, e.g., neural network, to include additional output nodes and a merge layer of nodes, and to train the modified model using the three different training data sets discussed above in the manner described above. For example, the hardened model engine 690 may receive a trained original neural network model 692 and generate a neural network model with extended output node layer 694. The two different sets of output nodes may then be trained using the different sets of the training data in the manner previously described above. That is, a first set of output nodes is trained using the original training data and is further trained to misclassify noisy training data. The misclassification of the noisy training data may be facilitated by the training logic 698 operating on a confusion matrix 699 to select alternative classifications, i.e. misclassifications, for the noisy training data. A second set of output nodes is trained to correctly classify adversarial training data. The merge nodes are then introduced to the adversarially and noisily trained modified neural network to generate a trained neural network model with a merge layer 696. The merge layer merges the outputs of the two different sets of output nodes. The resulting trained neural network model with merge layer nodes 696 may then be used to replace a corresponding trained model 625 used by the pipeline 600 and thereby harden the trained model 625 against gradient based attacks, such as evasion attacks.

Figure 7:
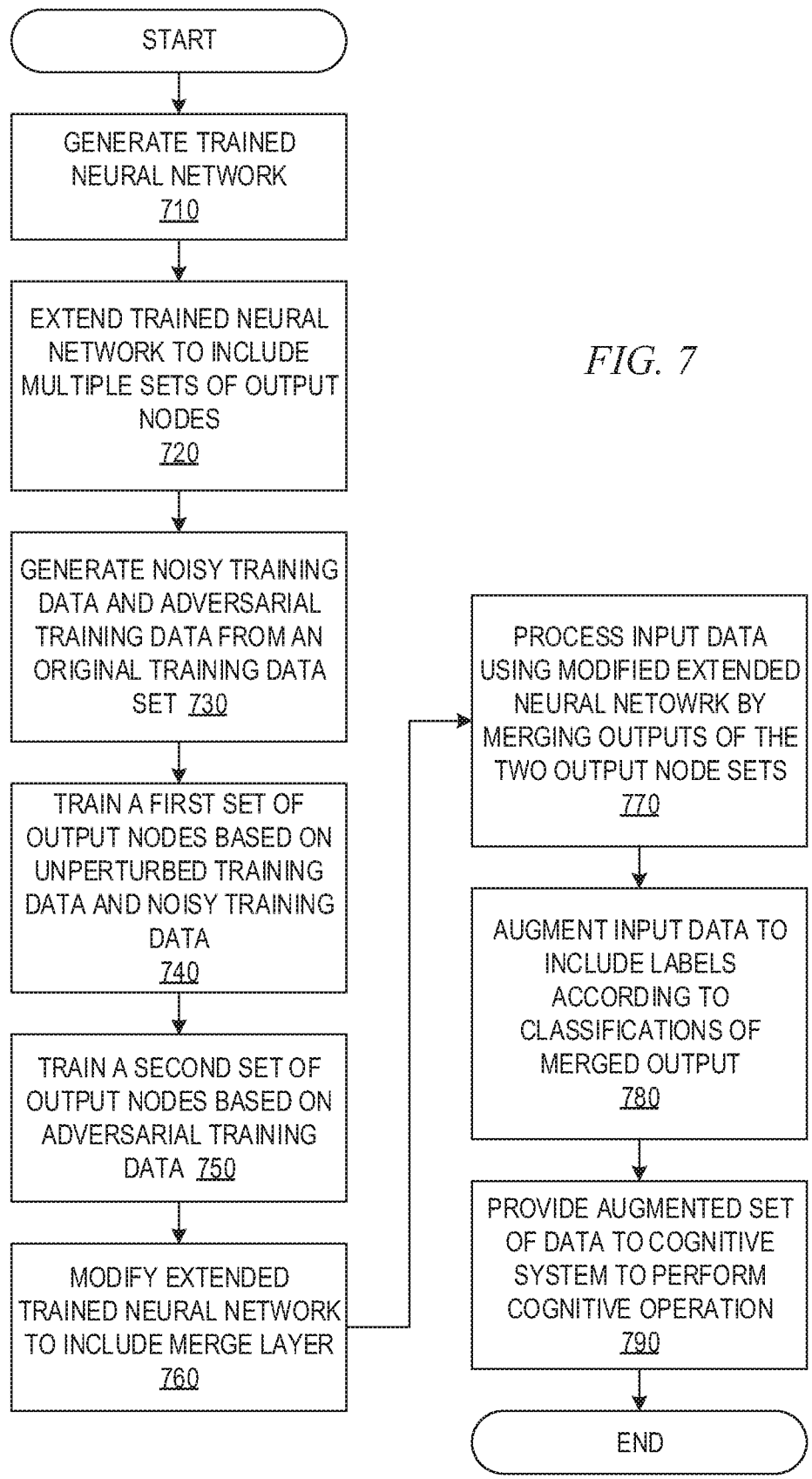
FIG. 7 is a flowchart outlining an example operation for training a model, e.g., neural network, against gradient based attacks in accordance with one illustrative embodiment.

FIG. 7 is a flowchart outlining an example operation for training a model, e.g., neural network, against gradient based attacks in accordance with one illustrative embodiment. As shown in FIG. 7, the operation starts by generating a trained neural network in a fashion generally known in the art (step 710). The trained neural network is then extended to include multiple sets of output nodes, e.g., two sets of output nodes are assumed for the illustrative embodiments described previously (step 720). From a given original training data set, a noisy training data set and adversarial training data set are generated, such as by using the fast gradient sign methodology with different multipliers for the different training data sets (step 730). A first set of output nodes is trained using the original (unperturbed) training data set and the noisy training data set (step 740). It should be noted that the training based on the original training data set is performed in a known manner, however the training based on the noisy training data set is performed to purposefully cause the neural network or model to misclassify the noisy input data, such as by using a confusion matrix or the like, as described above. The second set of output nodes are trained based on the adversarial training data (step 750).

After having trained the extended neural network with the additional output nodes using the three sets of training data, the extended neural network is then modified to include a merge layer with merge nodes that merge the outputs of the two sets of output nodes (step 760). The resulting modified extended trained neural network is then ready for deployment for use with new input data and operates on the input data while being hardened against gradient based attacks. Thus, the modified extended trained neural network may process input data (step 770) and augment the input data with appropriate labels according to the identified classifications indicated in the merged output generated at the merge nodes (step 780). Thereafter, the augmented (labeled) data set may be provided as input to a cognitive computing system that processes the labeled data set to perform a cognitive operation (step 790). The operation then terminates.

It should be appreciated that the above description is for illustrative purposes only and many modifications to the embodiments described above may be made without departing from the spirit and scope of the present invention. For example, there are various mechanisms that may be utilized to prevent the correct computation of gradients in the illustrative embodiments. For example, more or less layers may be utilized in the neural network to thereby provide simpler or more complex implementations. For example, embodiments may include additional layers, instead of two sets of outputs, may be provided with merging of the outputs in a later layer. In some embodiments, a single set of outputs nodes may be provided but trained with noisy samples and multiple layers making onion like shape loss surface with multiple ups and downs so that the gradients point to local optima. Also, some embodiments can build noisy samples with or without a confusion matrix, and instead use random labels, or those labels with large difference in the input space (e.g., give the label of images that are the most different from the class). Various other types of modifications may be utilized without departing from the spirit and scope of the present invention.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a communication bus, such as a system bus, for example. The memory elements can include local memory employed during actual execution of the program code, bulk storage, and cache memories which provide temporary storage of at least some program code in order to reduce the number of times code must be retrieved from bulk storage during execution. The memory may be of various types including, but not limited to, ROM, PROM, EPROM, EEPROM, DRAM, SRAM, Flash memory, solid state memory, and the like.

Input/output or I/O devices (including but not limited to keyboards, displays, pointing devices, etc.) can be coupled to the system either directly or through intervening wired or wireless I/O interfaces and/or controllers, or the like. I/O devices may take many different forms other than conventional keyboards, displays, pointing devices, and the like, such as for example communication devices coupled through wired or wireless connections including, but not limited to, smart phones, tablet computers, touch screen devices, voice recognition devices, and the like. Any known or later developed I/O device is intended to be within the scope of the illustrative embodiments.

Network adapters may also be coupled to the system to enable the data processing system to become coupled to other data processing systems or remote printers or storage devices through intervening private or public networks. Modems, cable modems and Ethernet cards are just a few of the currently available types of network adapters for wired communications. Wireless communication based network adapters may also be utilized including, but not limited to, 802.11 a/b/g/n wireless communication adapters, Bluetooth wireless adapters, and the like. Any known or later developed network adapters are intended to be within the spirit and scope of the present invention.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a data processing system comprising a processor and a memory, the memory comprising instructions which are executed by the processor to specifically configure the processor to implement a hardened neural network, the method comprising:
    configuring the hardened neural network executing in the data processing system to introduce noise in internal feature representations of the hardened neural network, wherein the noise introduced in the internal feature representations diverts gradient computations associated with a loss surface of the hardened neural network;
    configuring the hardened neural network executing in the data processing system to implement a merge layer of nodes that combine outputs of adversarially trained output nodes of the hardened neural network with output nodes of the hardened neural network trained based on the introduced noise;
    receiving, by the hardened neural network, input data for classification by the hardened neural network;
    processing, by the hardened neural network, the input data to generate classification labels for the input data and thereby generate augmented input data; and
    outputting, by the hardened neural network, the augmented input data to a computing system for processing of the augmented input data to perform a computing operation.

2. The method of claim 1, wherein configuring the hardened neural network executing in the data processing system to introduce noise in internal feature representations of the neural network comprises introducing noise into each class of a classification operation performed by the neural network during training of the neural network.

3. The method of claim 2, wherein configuring the hardened neural network executing in the data processing system to introduce noise in internal feature representations of the neural network comprises introducing at least one noisy region in the loss surface in association with a cluster of each class, and wherein gradients in the loss surface in association with the cluster of each class have a direction pointing towards the at least one noisy region.

4. The method of claim 1, wherein configuring the hardened neural network executing in the data processing system to introduce noise in internal feature representations of the neural network comprises:
    training a neural network, based on original training data, to classify input data samples into a plurality of different classes; and
    performing subsequent training of the neural network to generate the hardened neural network that is protected from adversarial input generation by diverting gradient calculations associated with the loss surface of the neural network.

5. The method of claim 4, wherein the subsequent training comprises:
    training the neural network, with regard to a first set of output nodes of the neural network, based on a first set of training data corresponding to data samples of the original training data;
    training the neural network, with regard to the first set of output nodes of the neural network, based on a second set of training data corresponding to noisy data samples generated from the first set of training data with first size perturbations introduced into the data samples; and
    training the neural network, with regard to a second set of output nodes of the neural network, based on a third set of training data corresponding to adversarial data samples generated from the first set of training data with second size perturbations, larger than the first size perturbations, introduced into the data samples.

6. The method of claim 5, wherein the first size perturbations and second size perturbations are introduced into the data samples of the first set of training data based on a fast gradient sign function, and wherein the first size perturbations have a smaller multiplier in the fast gradient sign function than the second size perturbations.

7. The method of claim 5, wherein training the neural network, with regard to the first set of output nodes of the neural network, based on the second set of training data comprises training the neural network to purposefully misclassify data samples in the second set of training data.

8. The method of claim 7, wherein training the neural network to purposefully misclassify data samples in the second set of training data comprises utilizing a confusion matrix data structure to identify an alternative classification to a correct classification for data samples in the second set of training data.

9. The method of claim 8, wherein the confusion matrix data structure comprises, for each data sample in the original training data, a count of a number of times the data sample is misclassified into an incorrect class by the neural network, and wherein utilizing the confusion matrix data structure to identify an alternative classification to the correct classification for data samples in the second set of training data comprises selecting, for each data sample in the second set of training data, a class having a lowest count.

10. The method of claim 1, wherein the computing system is a cognitive system and wherein the computing operation is a cognitive operation.

11. A computer program product comprising a computer readable storage medium having a computer readable program stored therein, wherein the computer readable program, when executed on a data processing system, causes the data processing system to:

configure a hardened neural network executing in the data processing system to introduce noise in internal feature representations of the hardened neural network, wherein the noise introduced in the internal feature representations diverts gradient computations associated with a loss surface of the hardened neural network;

configure the hardened neural network executing in the data processing system to implement a merge layer of nodes that combine outputs of adversarially trained output nodes of the hardened neural network with output nodes of the hardened neural network trained based on the introduced noise;

receive, by the hardened neural network, input data for classification by the hardened neural network;

process, by the hardened neural network, the input data to generate classification labels for the input data and thereby generate augmented input data; and output, by the hardened neural network, the augmented input data to a computing system for processing of the augmented input data to perform a computing operation.

12. The computer program product of claim 11, wherein configuring the hardened neural network executing in the data processing system to introduce noise in internal feature representations of the neural network comprises introducing noise into each class of a classification operation performed by the neural network during training of the neural network.

13. The computer program product of claim 12, wherein configuring the hardened neural network executing in the data processing system to introduce noise in internal feature representations of the neural network comprises introducing at least one noisy region in the loss surface in association with a cluster of each class, and wherein gradients in the loss surface in association with the cluster of each class have a direction pointing towards the at least one noisy region.

14. The computer program product of claim 11, wherein configuring the hardened neural network executing in the data processing system to introduce noise in internal feature representations of the neural network comprises:

training a neural network, based on original training data, to classify input data samples into a plurality of different classes; and performing subsequent training of the neural network to generate the hardened neural network that is protected from adversarial input generation by diverting gradient calculations associated with the loss surface of the neural network.

15. The computer program product of claim 14, wherein the subsequent training comprises:

training the neural network, with regard to a first set of output nodes of the neural network, based on a first set of training data corresponding to data samples of the original training data;

training the neural network, with regard to the first set of output nodes of the neural network, based on a second set of training data corresponding to noisy data samples generated from the first set of training data with first size perturbations introduced into the data samples; and training the neural network, with regard to a second set of output nodes of the neural network, based on a third set of training data corresponding to adversarial data samples generated from the first set of training data with second size perturbations, larger than the first size perturbations, introduced into the data samples.

16. The computer program product of claim 15, wherein the first size perturbations and second size perturbations are introduced into the data samples of the first set of training data based on a fast gradient sign function, and wherein the first size perturbations have a smaller multiplier in the fast gradient sign function than the second size perturbations.

17. The computer program product of claim 15, wherein training the neural network, with regard to the first set of output nodes of the neural network, based on the second set of training data comprises training the neural network to purposefully misclassify data samples in the second set of training data.

18. The computer program product of claim 17, wherein training the neural network to purposefully misclassify data samples in the second set of training data comprises utilizing a confusion matrix data structure to identify an alternative classification to a correct classification for data samples in the second set of training data.

19. The computer program product of claim 18, wherein the confusion matrix data structure comprises, for each data sample in the original training data, a count of a number of times the data sample is misclassified into an incorrect class by the neural network, and wherein utilizing the confusion matrix data structure to identify an alternative classification to the correct classification for data samples in the second set of training data comprises selecting, for each data sample in the second set of training data, a class having a lowest count.

20. An apparatus comprising:

at least one processor; and at least one memory coupled to the at least one processor, wherein the at least one memory comprises instructions which, when executed by the at least one processor, cause the at least one processor to:

configure a hardened neural network executing on the at least one processor to introduce noise in internal feature representations of the hardened neural network, wherein the noise introduced in the internal feature representations diverts gradient computations associated with a loss surface of the hardened neural network;

configure the hardened neural network executing on the at least one processor to implement a merge layer of nodes that combine outputs of adversarially trained output nodes of the hardened neural network with output nodes of the hardened neural network trained based on the introduced noise;

receive, by the hardened neural network, input data for classification by the hardened neural network;

process, by the hardened neural network, the input data to generate classification labels for the input data and thereby generate augmented input data; and output, by the hardened neural network, the augmented input data to a computing system for processing of the augmented input data to perform a computing operation.

* * * * *